United States Patent [19]

Watanabe

[11] Patent Number: 5,432,632
[45] Date of Patent: Jul. 11, 1995

[54] OPTICAL COMMUNICATION SYSTEM

[75] Inventor: Shigeki Watanabe, Kawasaki, Japan

[73] Assignee: Fujitsu Limited, Kawasaki, Japan

[21] Appl. No.: 944,203

[22] Filed: Sep. 14, 1992

[30] Foreign Application Priority Data

Sep. 13, 1991 [JP] Japan ................... 3-234302

[51] Int. Cl.⁶ ............ H04B 10/04; H04B 10/00
[52] U.S. Cl. .................... 359/191; 359/183; 359/126; 359/161; 359/154
[58] Field of Search ............ 359/180, 181, 183, 188, 359/189, 191, 192, 195, 154, 161, 126

[56] References Cited

U.S. PATENT DOCUMENTS

| | | | |
|---|---|---|---|
| 3,532,889 | 8/1967 | Kompfner ................... | 359/181 |
| 4,287,606 | 9/1981 | Lutes, Jr. et al. ............. | 359/181 |
| 4,918,747 | 4/1990 | Bekooij ........................ | 359/192 |
| 4,953,156 | 8/1990 | Olshansky et al. ........... | 359/181 |
| 4,989,200 | 1/1991 | Olshansky et al. ........... | 359/192 |
| 5,052,051 | 9/1991 | Naito et al. ................. | 359/192 |
| 5,134,509 | 7/1992 | Olshanky et al. ............ | 359/137 |

FOREIGN PATENT DOCUMENTS 0212932 8/1989 Japan .................. 359/183

OTHER PUBLICATIONS

Y.-H. Lee, et al., "Analysis of the Multichannel Coherent FSK Subcarrier Multiplexing System with Pilot Carrier and Phase Noise Cancelling Scheme", Journal of Optical Communications, vol. 12, No. 1, pp. 10–16, Mar. 1991, Berlin DE.
M.-S. Kao et al., "Coherent Subcarrier Multiplexed Star Distribution System Using Single Local Oscillator", Electronic Letters, vol. 26, No. 20, pp. 1680–1682, 27 Sep. 1990, Stevenage GB.
R. Gross et al., "Coherent FM–SCM System Using DFB Laseres and a Phase Noise Cancellation Circuit", IEEE Photonics Technology Letters, vol. 2, No. 1, Jan. 1990, pp. 66–68, New York.
T. Chikama et al., "Modulation and Demodulation Techniques in Optical Heterodyne PSK Transmission Systems", Journal of Lightwave Technology, vol. 8, No. 3, pp. 309–322, Mar. 1990, New York.

Primary Examiner—Leo H. Boudreau
Assistant Examiner—Rafael Bacares
Attorney, Agent, or Firm—Staas & Halsey

[57] ABSTRACT

An optical communication system in which light is modulated in sending equipment according to a composed signal obtained by mixing a signal frequency-multiplexed at the microwave level in a coherent SCM optical communication system with an unmodulated signal out of the frequency band of the frequency-multiplexed signal. The resultant modulated light is optical-heterodyne-detected. A demodulating unit demodulates a frequency-multiplexed signal according to an electric signal delayed by a delay unit by the time equal to the time delay in an unmodulated component extracting unit. Only the frequency components of a frequency-multiplexed signal and an unmodulated signal must be received in receiving equipment, without receiving the component in a broad frequency band from the frequency component to the main carrier component of the frequency-multiplexed signal.

11 Claims, 13 Drawing Sheets

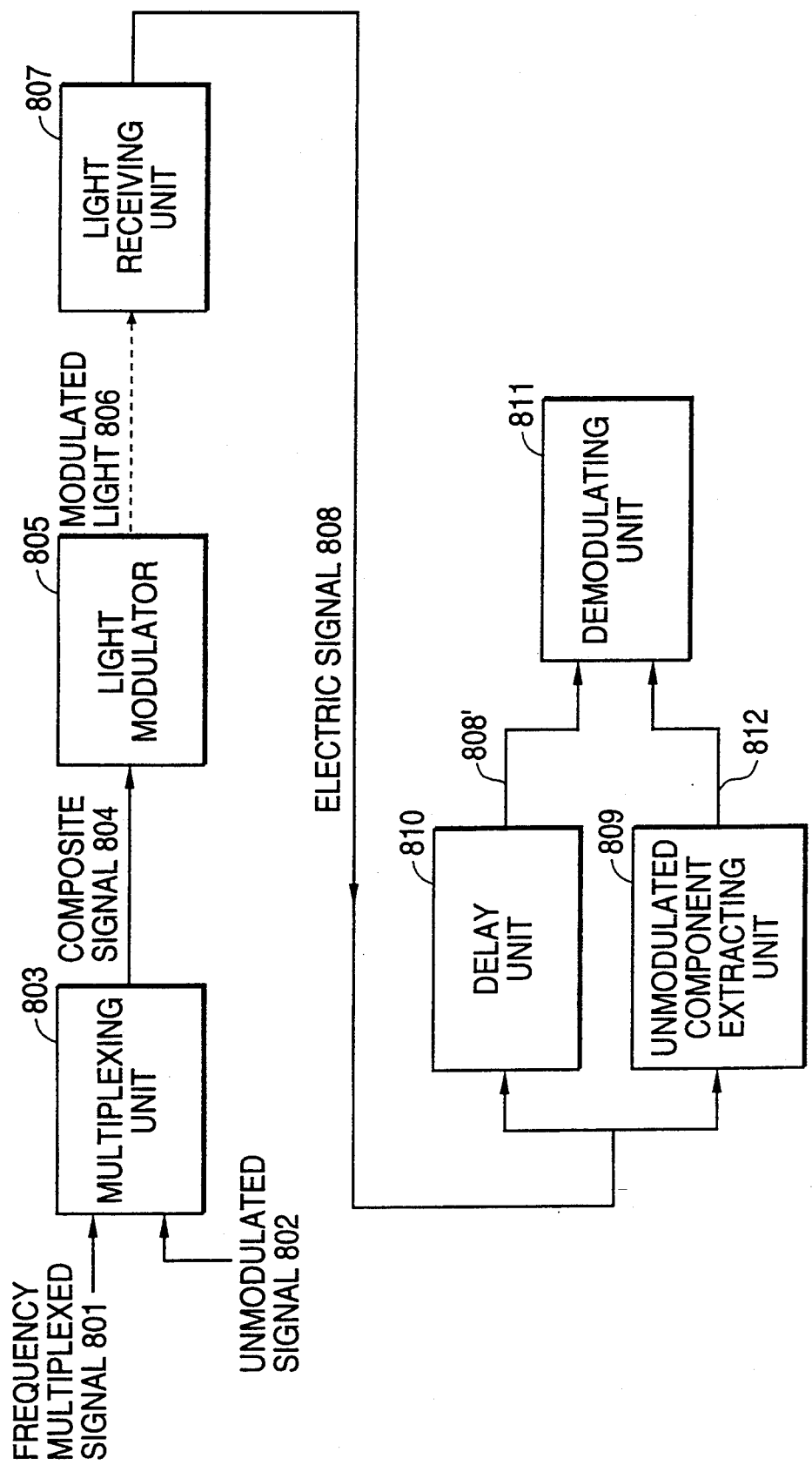

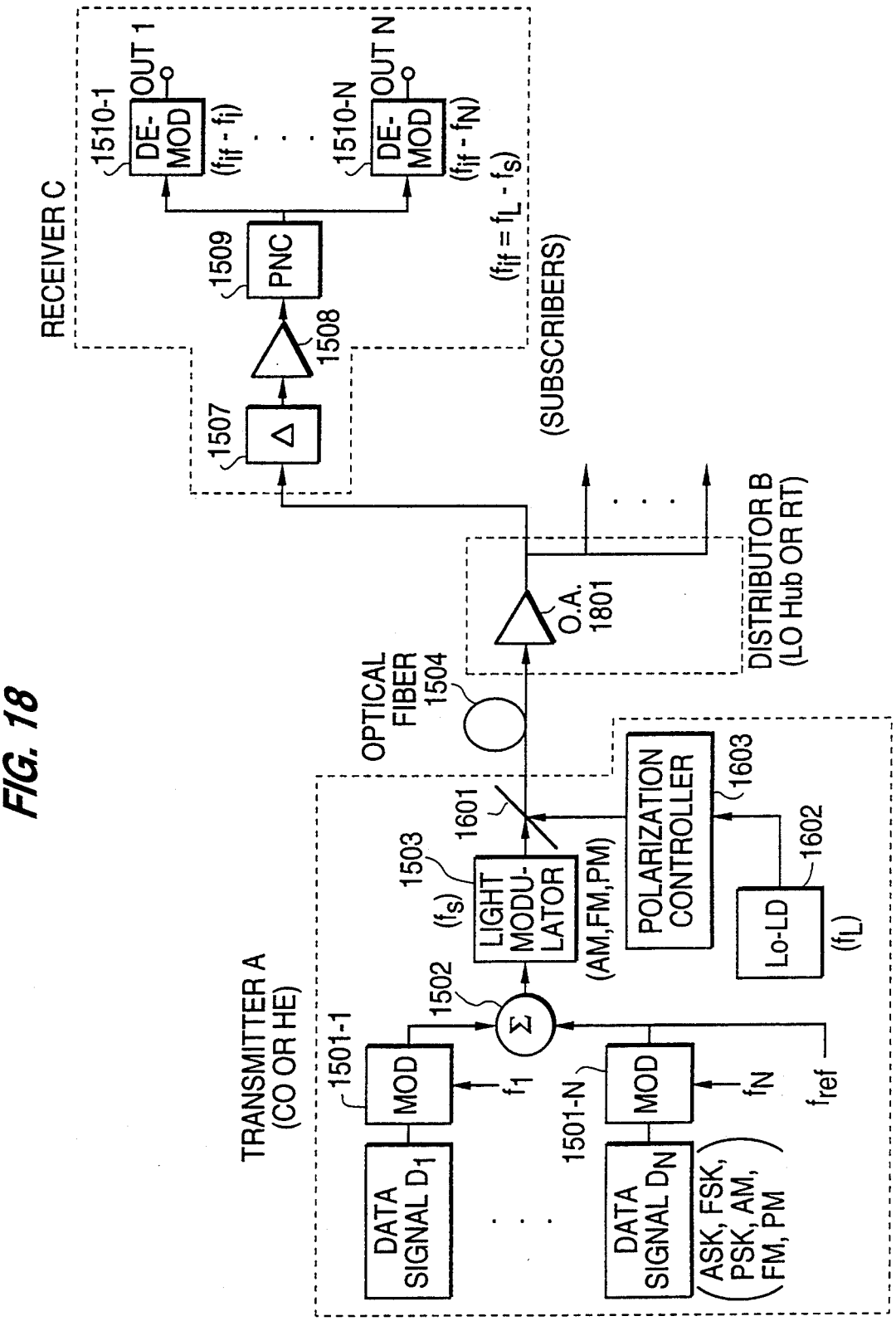

OPTICAL COMMUNICATION SYSTEM

BACKGROUND OF THE INVENTION

1. Field of the Invention

The present invention relates to an optical communication system for performing communication according to data signals by modulating and transmitting optics, and specifically to a phase noise canceling system for reducing phase noises in an optical communication system comprising a phase processing unit.

2. Description of the Related Art

Optical communication systems have made remarkable progress with the development of coherent optical communication systems.

With a coherent optical communication system, the amplitude, frequency, and phase, etc. of a high coherency laser light emitted from a light source such as semiconductor lasers, etc. are modulated in the sending equipment directly by a data signal to be communicated. A resultant modulated light is transmitted through a low-loss, broadband, and nonconductive transmission line such as optical fiber cables. In receiving equipment, a received modulated light is converted by optical heterodyne detection or homodyne detection into an electric signal having a frequency of an intermediate frequency band or a base band frequency band, and a data signal is demodulated from the electric signal.

With the above described coherent optical communication system, a laser light, that is, a carrier light, is directly modulated according to a data signal in a base band. Namely, a data signal is transmitted as a modulation component of a carrier light, and can be received with high sensitivity through optical heterodyne or homodyne detection.

Besides, with a coherent optical communication system, a large light frequency range (light wavelength range) can be used through the optical heterodyne detection, etc. As a result, a multiplexed light frequency (wavelength) transmission system for transmitting a data signal of a plurality of channels can be realized using various carrier lights having different frequencies (wavelengths).

The applicant of the present invention refers to a subcarrier multiplexing (SCM) optical communication system in the patent application of "Tokugan-hei P2-242615" in Japan and in the serial number "07/760,019" of the U.S. Patent Application. In the SCM optical communication system, a data signal of a plurality of channels is frequency- multiplexed at a microwave level in an electrical stage, and a resultant electric signal modulates and transmits a carrier light.

Therefore, a frequency multiplexing operation is not always required in a light stage, but an electrical stage multiplexes a frequency (in sending equipment) or identifies it (in receiving equipment). As a result, a light control unit for performing a high level control in a light stage can be minimized, and a frequency multiplexing optical communication system can be realized at a low cost.

Besides, the above described SCM optical communication system can be combined with a coherent optical communication system using direct modulation of the above described semiconductor laser light, etc. and optical heterodyne detection, etc. With the coherent SCM optical communication system, an optical communication system having a higher channel density and a larger capacity than a conventional coherent optical communication system and a conventional SCM optical communication system can be realized at a low cost.

As described above, the latest optical communication system such as coherent optical communication systems, SCM optical communication systems, and coherent SCM optical communication systems, etc. can be widely used for various applications in a conventional optical communication system, a broadband transmission system for an optical CATV (Cable Television) network and image information, and in any large capacity optical communication network for the future ISDN (Integrated Service Digital Network), etc.

In the above described various optical communication systems, if the frequency or the phase of a carrier light can be modulated by a data signal, random phase noises of the carrier itself or phase noises incorporated in a communication process largely affect the demodulating function of the data signal. Therefore, these phase noises must be appropriately canceled.

Even though the amplitude of a carrier light is modulated by a data signal, the phase noise affects the demodulating function of a data signal if the optical heterodyne detection is performed in the demodulating process and a data signal is transmitted at a low rate.

The phase noise canceling method can be a light frequency canceling method or an intermediate frequency stage (IF stage) canceling method after optical heterodyne (or optical homodyne) detection. In the phase noise canceling method in the light stage, a light circuit is complicated, and the center frequency of a modulated light is exceedingly higher (about 1000 times) than the center frequency in the IF stage after the detection, thereby requiring precise control and hardly guaranteeing its realization. Thus, the phase noise canceling process can be realized in the IF stage much more easily.

FIG. 1 (Prior Art) shows a basic configuration of the conventional coherent optical communication system capable of canceling phase noises.

First, the sending equipment is explained below.

Data signal D is a communication signal in the base band having a predetermined transmission rate B. FIG. 2 (Prior Art) shows its frequency characteristics. Data signal D requires that the main lobe of its frequency component is surely stored. Therefore, in data signal D, harmonic components other than the main lobe are removed by a low-pass filter.

A light modulator 101 modulates using data signal D a carrier light having a light frequency of $f_s$. The light modulating method is, for example, a phase shift keying (PSK) method. The carrier light is, for example, a laser light from a semiconductor laser (a distributed feedback (DFB) semiconductor laser having a broadband with a narrow width of a spectral line is desirable). The above described light modulating operation can be realized as directly modulating using data signal D the bias voltage of the LiNbO$_3$ light phase modulator and the bias current or temperature of the semiconductor laser.

A modulated light obtained by the light modulator 101 is transmitted through optical fibers 102.

Next, the receiving equipment is explained below.

A modulated light transmitted through the optical fiber 102 is mixed in a mixing circuit 103 with a local oscillator light beam having a center frequency of $f_L$ from a local oscillator laser divice (Lo-LD) 104 which is a semiconductor laser. The mixed light is opticalheterodyne-detected by being received by a light detector 105 such as photodiodes. In this case, the difference frequency $|f_s-f_L|$ between the center light frequency $f_s$ of the modulated light (equal to the center light frequency of the carrier light) and the light frequency $f_L$ of the local oscillator light equals the center frequency $f_{if}$ of an electric signal in the intermediate frequency stage (IF stage) after the detection. The mixing circuit 103 can be, for example, a half-mirror or fiber-type light coupler.

An intermediate frequency signal output by the light detector 105 is amplified by an amplifier 106, and then applied to a phase noise canceling circuit (PNC) 107 where a phase noise contained in an intermediate frequency signal is canceled.

The intermediate frequency signal in which a phase noise is canceled can be demodulated by a demodulating circuit (DEMOD) 108.

FIG. 3 (Prior Art) shows the configuration of the PNC 107 shown in FIG. 1. In this prior art technology, a carrier component is regenerated from a received intermediate frequency signal. Then, a phase noise can be canceled by comparing the phase between the carrier component and the received intermediate frequency signal.

In an ordinary coherent optical communication system, a data signal in a base band is transmitted as a modulated component of a carrier light as described above. Therefore, in the IF stage after the detection, the band of the frequency $f_{if}$ of a carrier component and the frequency band of a data signal are included. Accordingly, only the carrier component must be regenerated by an appropriate means.

Thus, in the PNC 107 shown in FIG. 1 and having the configuration shown in FIG. 3, a received intermediate frequency signal is branched to two routes. In the first route, a received intermediate frequency signal is delayed by a delay circuit 301. In the second route, a carrier component is regenerated by a frequency multiplier 302, a band-pass filter 303, and a frequency divider 304. Then, an output signal in each route is mixed by a multiplier 305, thereby generating an demodulated signal with a phase noise canceled.

The principle of the phase noise canceling method based on the configuration shown in FIG. 3 is explained below. The configuration shown in FIG. 3 can be assumed if the light modulator 101 shown in FIG. 1 light-modulates a data signal D, which is a digital signal, by the PSK method. In the following equations, $A_1$–$A_5$ are predetermined constants.

First, the intermediate frequency signal $I_1$ applied from the amplifier 106 shown in FIG. 1 can be represented by the following equation (1).

$$I_1 = A_1 \cos\{2\pi f_{if}t + \theta(t) + \phi(t)\} \quad (1)$$

where $\theta(t)$ indicates a phase component corresponding to a data signal D light-modulated by the PSK method, and has a phase value of either 0 or $\pi$. $\phi(t)$ indicates a phase noise to be canceled.

The intermediate frequency signal $I_1$ is branched to two routes.

First, an intermediate frequency signal $I_2$ delayed by the delay circuit 301 in the first route can be represented by the following equation (2) according to equation (1).

$$I_2 = A_1\cos\{2\pi f_{if}(t - \Delta t_1) + \theta(t - \Delta t_1) + \phi(t - \Delta t_1)\} \quad (2)$$

where $\Delta t_1$ indicates a delay time in the delay circuit 301.

An intermediate frequency signal $I_3$ having the frequency doubled by the frequency multiplier 302 in the second route can be represented by the following equation according to equation (1).

$$I_3 = A_2 \cos\{2\pi \cdot 2f_{if}t + 2\theta(t) + 2\phi(t)\}$$

where $\theta(t) = 0, \pi$. Therefore, $2\theta(t) = 0, 2\pi$. Accordingly, the above equation can be represented by the following equation (3).

$$I_3 = A_2 \cos\{2\pi \cdot 2f_{if}t + 2\phi(t)\} \quad (3)$$

The intermediate frequency signal $I_3$ is filtered through the band-pass filter (BPF) 303 for passing only the frequency components close to the frequency $2f_{if}$, and then applied to the frequency divider 304. An intermediate frequency signal $I_4$ output by the frequency divider 304 can be represented by the following equation according to equation (3) above.

$$I_4 = A_3 \cos\{2\pi \cdot f_{if}t + \theta(t)\}$$

where a time delay arises when an intermediate frequency signal is transmitted through the frequency multiplier 302, the BPF 303, and the frequency divider 304. In consideration of the time delay, an output $I_4$ of the frequency divider 304 can be represented by the following equation (4) according to the equation above, where $\Delta t_2$ indicates the time delay.

$$I_4 = A_3 \cos\{2\pi f_{if}(t - \Delta t_2) + \phi(t - \Delta t_2)\} \quad (4)$$

As described above, an intermediate frequency signal $I_4$, which is a carrier component, can be regenerated from the second route.

Then, the intermediate frequency signal $I_4$ is multiplied by the multiplier 305 with the intermediate frequency signal $I_2$ delayed by the delay circuit 301 in the first route. In the resultant output signals, a component $I_5$ in the detection band can be represented by the following equation (5) according to the above equations 2 and 4.

$$I_5 = A_4\cos\{2\pi f_{if}(\Delta t_1 - \Delta t_2) - \theta(t - \Delta t_1) - \Delta\phi(\Delta t_1 - \Delta t_2)\} \quad (5)$$

However, $\Delta\phi(\Delta t_1 - \Delta t_2)$ indicates a phase noise contained in the output from the multiplier 305, and can be represented by the following equation (6).

$$\Delta\phi(\Delta t_1 - \Delta t_2) = \phi(t - \Delta t_1) - \phi(t - \Delta t_2) \quad (6)$$

If the above described phase noise indicates a zero-mean Gaussian white noise, $\sigma^2$ the variance of the phase deviation can be represented by the following equation (7).

$$\sigma^2 = 2\pi \Delta v_{if}|\Delta t_1 - \Delta t_2| \quad (7)$$

where $\Delta v_{if}$ indicates the line width of a beat spectrum.

According to the above equations (6) and (7), the fluctuation of the phase noise component $\Delta\phi(\Delta t_1 - \Delta t_2)$ can be set to 0 by controlling the delay circuit 301 such that the time delay $\Delta t_1$ in the delay circuit 301 equals the time delay $\Delta t_2$ in the frequency multiplier 302, the BPF 303, and the frequency divider 304. Thus, the output $I_5$ from the multiplier 305 represented in the above described equation (5) is represented in the following equation (8).

$$I_5 = A_4 \cos\{\theta(t-\Delta t_1)\} \quad (8)$$

where a phase noise is canceled out. Applying the intermediate frequency signal $I_5$ to the DEMOD 108 shown in FIG. 1 enables a data signal D to be demodulated with the phase noise canceled.

However, the conventional coherent optical communication system having the configuration shown in FIGS. 1 and 3 requires in the configuration of the PNC 107 the frequency multiplier 302, the BPF 303, and the frequency divider 304, etc. in order to regenerate a carrier component from a received intermediate frequency signal. This offers the problem that the total cost of the system rises considerably.

To guarantee the regeneration of a carrier, the light phase modulation (0, $\pi$) must be successfully performed. This is accompanied by the problem of difficulty in techniques.

Next, FIG. 4 (Prior Art) shows the basic configuration of the conventional coherent SCM optical communication system capable of canceling phase noises. First, the sending equipment is explained below.

Each of modulators 401-1–401-N modulates each of the carriers of the different frequencies $f_1$–$f_N$ allocated to each channel according to each of the data signals $D_1$–$D_N$. This modulating method can be an amplitude modulation (AM), a frequency modulation (FM), or a phase modulation (PM) if the data signal D is an analog signal, and can be an amplitude shift keying (ASK), a frequency shift keying (FSK), or a phase shift keying (PSK) if the data signal D is a digital signal.

Then, a multiplexer 402 composes each of the channel signals modulated by each of the modulators 401-1–401-N to generate a subcarrier multiplexed signal (an SCM signal). The multiplexer 402 only has to be equipped with a function of adding electric signals, and can be realized from a simple and cheap unit such as a micro-wave coupler, etc.

Each of the channel signals must be frequency-multiplexed in the frequency axis so that signals may not leak to the adjacent channels.

Therefore, in the modulator 401-i ($1 \leq i \leq N$), a band-pass filtering process is performed based on each of the frequencies $f_i$ after the modulation such that only the signal component of the main lobe of each data signal $D_i$ can be extracted. That is, if the transmission rate of a data signal $D_i$ is defined as $B_i$, a band-pass filtering process is performed, where the cut-off frequency is $f_i \pm B_i$ after the modulation.

Otherwise, in the modulator 401-i, a low-pass filtering process in which a cut-off frequency is defined as $B_i$ can be performed before the modulation such that only the signal component of the main lobe of each data signal $D_i$ in the base band can be extracted.

According to each filtering process by the above described modulators 401-1–401-N, the frequency interval for each channel signal can be approximately double the data transmission rate $B_i$ at minimum for a digital signal.

FIG. 5 (Prior Art) shows the configuration of channels on the frequency axis of an SCM signal obtained by the multiplexer 402.

Next, a light modulator 403 modulates a carrier light having the light frequency of $f_s$ according to an SCM signal output by the multiplexer 402. This light modulating method can be an AM, an FM, or a PM method. As in the case shown in FIG. 1, the carrier light can be a laser light obtained by a semiconductor laser, etc.

The modulated light obtained by the light modulator 403 is transmitted through optical fibers 404.

Next, the receiving equipment is explained below.

A modulated light transmitted through the optical fiber 404 is optical-heterodyne-detected by a mixing circuit 405, a Lo-LD 406, and a light detector 407 in the same configuration as that shown in FIG. 1.

As in the case shown in FIG. 1, the center frequency $f_{if}$ of the intermediate frequency signal obtained by the light detector 407 is equal to the difference frequency $|f_s - f_L|$ between the center frequency $f_s$ of the modulated light from the optical fiber 404 and the light frequency $f_L$ of the local oscillator light. FIG. 6 (Prior Art) shows the configuration of the first-order lower side band IF spectrum having the above described center frequency $f_{if}$. As shown in FIG. 6, in the IF stage, each of the subcarrier components having the center frequencies $f_{if}$-$f_1$, $f_{if}$-$f_2$, ..., $f_{if}$-$f_N$ is frequency-multiplied with the unmodulated main carrier component at the frequency $f_{if}$.

The above described intermediate frequency signal is applied to the PNC 409 after being amplified by an amplifier 408, and the phase noise contained in the intermediate frequency signal is canceled by a PNC 409.

The intermediate frequency signal is branched to the number of channels after having the phase noise canceled. Each of demodulators 410-1–410-N extracts each of the subcarrier components close to each of the center frequencies of $f_{if}$-$f_1$, $f_{if}$-$f_2$, ..., $f_{if}$-$f_N$ from each of the above described branched center frequency signals, and demodulates each of the data signals $D_1$–$D_N$.

With the above described coherent SCM optical communication system, a frequency-multiplexed signal (SCM signal) is generated by cheap multiplexers such as microwave couplers in the electric stage, and then, the light modulation is performed by the SCM signal. Therefore, only one light modulator is required, and the total cost for the whole system can be considerably reduced. Besides, as described above, the interval of channels can be approximated to double the transmission rate in the sending equipment. Therefore, the receiving equipment can collectively receive all or a plurality of channels using a broadband receiver.

FIG. 7 (Prior Art) shows the configuration of the PNC 409 shown in FIG. 4. As in the coherent optical communication system shown in FIG. 3, this prior art technology extracts a main carrier component from a received intermediate frequency signal. Then, a phase noise can be canceled by comparing the phase of the main carrier component with that of the intermediate frequency signal.

In FIG. 7, a received intermediate frequency signal is branched to two routes. In the first route, the received intermediate frequency signal is delayed by a delay circuit 701. In the second route, the main carrier component is extracted by a band-pass filter 702. Then, a multiplier 703 mixes output signals in both routes, and an intermediate frequency signal in which a phase noise is canceled can be obtained.

The principle of the phase noise canceling method based on the configuration shown in FIG. 7 is explained below. In the following explanation, the light modulator 403 shown in FIG. 4 performs a light modulation in the PM method. In the following equations $A_6$, $A_6'$, $A_7$, and $A_8$ indicate predetermined constants.

First, an intermediate frequency signal $I_6$ applied by the amplifier 408 shown in FIG. 4 can be represented by the following equation (9).

$$I_6 = A_6 J_1(m) \sum_{i=1}^{N} \cos\{2\pi(f_{if} - f_i)t - D_i(t) + \phi(t)\} + \quad (9)$$
$$A_6' J_0(m) \cos\{2\pi f_{if} t + \phi(t)\}$$

As described above, $D_i(t)$ ($1 \leq i \leq N$) indicates a data signal of each channel, $f_{if}$ indicates a main carrier frequency in the IF stage, $f_i$ ($1 \leq i \leq N$) indicates a carrier frequency in the electric stage corresponding to each channel (FIG. 5), and ($f_{if}$-$f_i$) indicates a subcarrier frequency in the IF stage. m indicates a modulation index or an PM modulation index, $\phi(t)$ indicates a phase noise to be canceled, and $J_n$ (n=0,1) indicates the n-th order Bessel function of the first kind.

The intermediate frequency signal $I_6$ is branched to two routes.

First, an intermediate frequency signal $I_7$ delayed by the delay circuit 701 in the first route can be represented by the following equation (10) according to equation (9).

$$I_7 = A_6 J_1(m) \sum_{i=1}^{N} \cos\{2\pi(f_{if} - f_i)(t - \Delta t_1) - D_i(t - \Delta t_1) + \quad (10)$$
$$\phi(t - \Delta t_1)\} + A_6' J_0(m) \cos\{2\pi f_{if}(t - \Delta t) + \phi(t - \Delta t_1)\}$$

where $\Delta t_1$ indicates delay time in the delay circuit 701 as in the case shown in FIG. 3.

The BPF 702 in the second route only passes the frequency component close to the main carrier frequency $f_{if}$. An intermediate frequency signal $I_8$ output from the second route can be represented by the following equation according to equation (9).

$$I_8 = A_7' J_0(m) \cos\{2\pi \cdot f_{if} t = \phi(t)\}$$

A time delay arises when the intermediate frequency signal is transmitted through the BPF 702. An output $I_8$ from the BPF 702 can be represented by the following equation (11), where the time delay is defined as $\Delta t_2$, according to the equation above.

$$I_8 = A_7 J_0(m) \cos\{2\pi \cdot f_{if}(t - \Delta t_2) + \phi(t - \Delta t_2)\} \quad (11)$$

As described above, the intermediate frequency signal $I_8$, which is a main carrier component, can be regenerated from the second route.

Then, the intermediate frequency signal $I_8$ is multiplied by the multiplier 703 by the intermediate frequency signal $I_7$ delayed by the above described delay circuit 701 in the first route. In the resultant output signals, a component $I_9$ in the detection band can be represented by the following equation (12) according to equations (10) and (11).

$$I_9 = A_8 \Sigma \cos\{2\pi f_{if}(\Delta t_1 - \Delta t_2) + 2\pi f_i(t - \Delta t_1) + \quad (12)$$
$$D_i(t - \Delta t_1) - \Delta\phi(\Delta t_1 - \Delta t_2)\}$$

where $\Delta\phi(\Delta t_1 - \Delta t_2)$ and $\sigma^2$ can be obtained in the same manner as in equations (6) and (7) shown in FIG. 3. Therefore, as in the case shown in FIG. 3, the phase noise component $\Delta\phi(\Delta t_1 - \Delta t_2)$ can be set to 0 by controlling the delay circuit 702 such that the delay time $\Delta_2$ in the delay circuit 701 equals the time delay $\Delta t_2$ in the BPF 702. Accordingly, the output $I_9$ from the multiplier 703 shown in equation (12) above can be represented by the following equation (13).

$$I_9 = A_8 \Sigma \cos\{2\pi f_i(t - \Delta t_1) - D_i(t - \Delta t_1)\} \quad (13)$$

Applying the intermediate frequency signal $I_9$ to each of the DEMODs 410-1–410-N shown in FIG. 1 enables a data signal $D_i$ to be demodulated with the phase noise canceled.

However, with the conventional coherent SCM optical communication system having the configuration shown in FIGS. 4 and 7, the PNC 409 extracts the unmodulated main carrier component of the frequency $f_{if}$ as shown in equations (9) through (13) above. At this time, each of the subcarrier components having the center frequencies $f_{if}$-$f_1$, $f_{if}$-$f_2$, ..., $f_{if}$-$f_N$ must be processed correspondingly.

The power of the unmodulated main carrier component at the frequency $f_{if}$ shown in FIG. 6 is larger than the power of each of the subcarrier components having the center frequencies $f_{if}$-$f_1$, $f_{if}$-$f_2$, ..., $f_{if}$-$f_N$. That is, the former has a larger value of $(J_0(m)/J_1(m))^2$. Therefore, the frequency interval between the frequency $f_{if}$ of the main carrier component and the center frequency $f_{if}$-$f_1$ of the first subcarrier component must be sufficiently wide (about several giga Hz). If the frequency interval is not sufficient, a number of high-degree modulation components enter the reception band, thereby badly reducing the reception sensitivity.

For the above described reason, the optical heterodyne detection circuit comprising the mixing circuit 405, the Lo-LD 406, the light receiver 407, and the amplifier 408 requires a broadband circuit for simultaneously receiving the main carrier components and the subcarrier components. Thus, it has a problem that the total cost for the whole system soars.

SUMMARY OF THE INVENTION

The present invention has been developed based on the above described background and aims at canceling phase noises using a simple circuit configuration without a broadband detecting circuit in an optical communication system capable of canceling phase noise.

The present invention comprises a plurality of electrical modulating units provided corresponding to each of the transmission signals in a plurality of channels for modulating each carrier signal having a different microwave frequency according to each transmission signal, a frequency multiplexing unit for frequency-multiplexing each modulated signal from each electrical modulating unit, a multiplexing unit for frequency-multiplexing a frequency-multiplexed signal from the frequency multiplexing unit and an unmodulated signal having a frequency out of the frequency band of the frequency-multiplexed signal, a light modulating unit for performing a light modulation according to a composed signal obtained by the multiplexing unit and for outputting a resultant modulated light, a light receiving unit for detecting the modulated light and converting it to an electric signal, an unmodulated component extracting unit for extracting the frequency component of the unmodulated signal from the electric signal from the light receiving unit, a delay unit for delaying the electric signal from the light receiving unit by the time equal to the signal delay time in the unmodulated component extracting unit, and a unit for canceling a phase noise according to the electric signal from the delay unit and the unmodulated signal extracted from the unmodulated component extracting and unit for demodulating the transmission signal in each channel.

According to the aspect of the present invention having the above described configuration respectively, the frequency component of an unmodulated signal composed in the sending equipment must be regenerated in a phase noise canceling process without regenerating components in the broad frequency band from the frequency component of a frequency-multiplexed signal to the main carrier component when the optical heterodyne or homodyne detection, for example, is performed. In this case, a broadband circuit is not required as a light receiving unit, thereby considerably reducing a total cost for the whole system.

When the optical heterodyne or homodyne detection is performed in the aspect of the present invention, the demodulating function is not affected at all in the demodulating unit as long as the delay time in the delay unit equals the signal delay time in the unmodulated component extracting unit although the frequency of the main carrier component is changed, that is, the center light frequency of a modulated light or the frequency of a local oscillator light in the light receiving unit is changed. Accordingly, the requirements for the oscillation frequency from the local oscillating unit in the light modulating unit or the light receiving unit can be considerably reduced, thereby minimizing the cost for the whole system.

Additionally, in a coherent SCM optical communication system to which the present invention is applied, the channel interval (frequency interval) of each transmission signal multiplexed at a microwave level in the sending equipment can be reduced to approximately the double each data transmission rate for a digital signal, for example. Thus, the receiving equipment collectively receives all or a plurality of channels without need of a broadband receiver, thereby greatly increasing the number of receiving channels at a low cost.

If the present invention in which the optical heterodyne or homodyne detection is performed is applied to an optical communication system of a light distributing network, a local oscillator unit as a part of a light receiving unit and a mixing unit are provided in a repeater when the repeater (distributor) is only a few kilometers apart from each of the receivers, thereby transmitting to each receiver according to the branches of fibers a mixed light obtained by mixing a modulated light and a local oscillator light in the distributor directly. As a result, a specific mixing unit is not required at each receiver, thereby considerably reducing the cost for each receiver and practically realizing a light distributing network through a low-cost coherent SCM optical communication system.

Furthermore, a precise polarization control can be realized in a sending equipment by providing a local oscillating unit, a mixing unit, and a polarization controlling unit in the sending equipment, and the cost for one receiver can be much reduced in the configuration of the present invention, where the optical heterodyne or homodyne detection is performed, for the reason described above.

Besides, a system margin can be improved by providing a light amplifier as a light post-amplifier in the output unit of the transmitter or by providing a light amplifier before or after a light branch in the repeater in the light distributing network, thereby extending the transmission distance and increasing the number of distributions.

BRIEF DESCRIPTION OF THE DRAWINGS

Other objects and features of the present invention can be easily recognized by referring to the attached drawings and the description of preferred embodiments of the present invention.

FIG. 8 is a block diagram of the principle of the present invention;

FIG. 18 shows the configuration of the sixth embodiment of the present invention,

DESCRIPTION OF THE PREFERRED EMBODIMENTS

Explanation of the Principle

Figure 1:
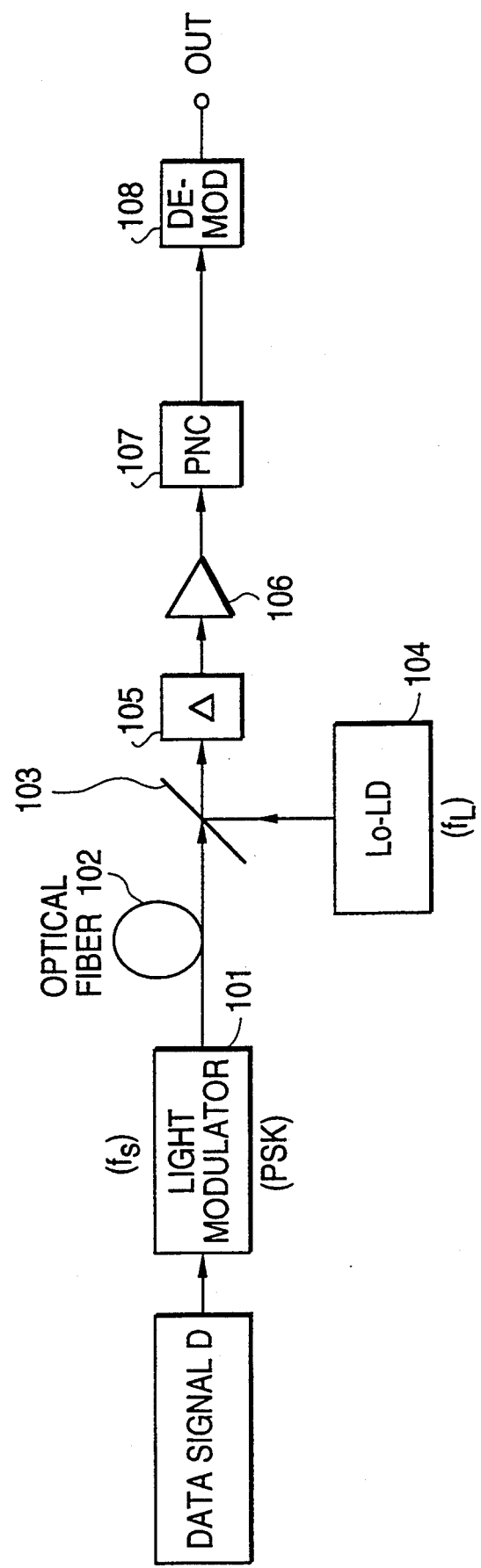
FIG. 1 (Prior Art) shows the configuration of the conventional coherent optical communication system capable of canceling phase noises.
Figure 2:
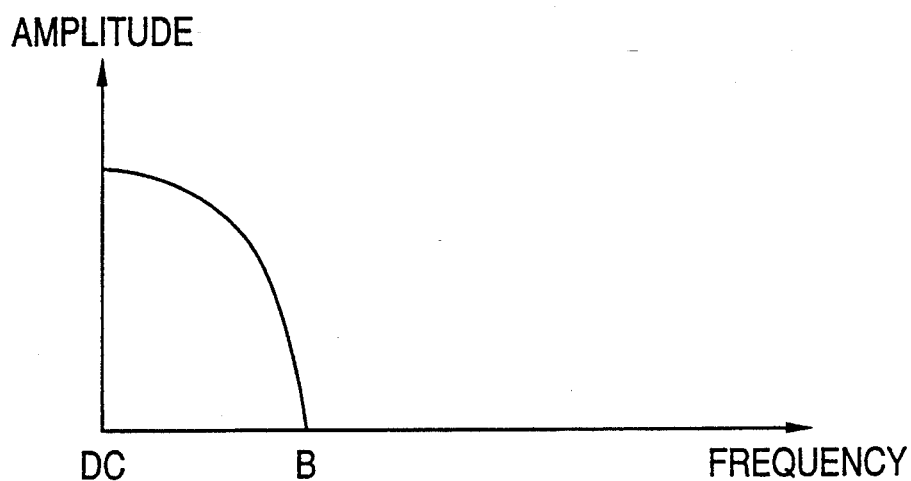
FIG. 2 (Proir ART) shows the frequency characteristics of the main lobe of the data signal D in the conventional coherent optical communication system.

FIG. 8 is a block diagram of the principle of the present invention,

A coherent subcarrier multiplexing (SCM) optical communication system is applied in the present invention. In this case, a plurality of electrical stage modulating units (not shown in FIG. 8) provided corresponding to each transmission signal in a plurality of channels modulate each carrier signal having a different microwave frequency according to each transmission signal. A frequency multiplexing unit (not shown in FIG. 8) frequency-multiplexes in the microwave stage each modulated signal from each electric stage modulating unit. Then, the frequency-multiplexed signal 801 from the frequency multiplexing unit is applied to the multiplexing unit 803. The multiplexing unit 803 multiplexes the above described frequency-multiplexed signal 801 with the unmodulated signal 802 having the frequency out of the frequency band of the frequency-multiplexed signal.

Next, as shown in FIG. 8, a light modulating unit 805 performs a light modulation according to a composed signal 804 obtained by the multiplexing unit 803, and outputs a resultant modulated light 806. At this time, the light modulating method can be an amplitude modulating (AM) method, a frequency modulating (FM) method, or a phase modulating (PM) method. The light modulating unit 805 can be made of a semiconductor laser, can contain a LiNbO3 modulator or both of them.

The modulated light 806 is output directly to the light transmission line of optical fibers, etc., or output thereto after mixed with the local oscillator light as described later.

A light receiving unit 807 detects the modulated light 806 and converts it to an electric signal 808. The light receiving unit 807 comprises, for example, a local oscillating unit such as semiconductor lasers, etc. for oscillating, for example, a local oscillator light, a mixing unit for mixing the local oscillator light and the modulated light 806, and a light detecting element such as photodiodes, etc. for detecting the mixed light and converting it to the electric signal 808. The configuration can be used for the optical heterodyne detection method if the center frequency of the modulated light is different from the frequency of the local oscillator light, and can be used for the optical homodyne detection method if these frequencies are the same. The local oscillating unit and the mixing unit are not necessarily provided in a receiver, but can be provided in a repeater or a transmitter in a light distributing network as described later.

Next, an unmodulated component extracting unit 809 extracts from the electric signal 808 from the light receiving unit 807 a frequency component 812 of the unmodulated signal 802 multiplexed with the frequency-multiplexed signal 801 in the sending equipment. The unmodulated component extractor 809 is a band-pass filter for passing, for example, only the frequency component 812 in the unmodulated signal 802.

A delay unit 810 delays the electric signal 808' from the light receiving unit 807 by the time equal to the signal delay time in the unmodulated component extracting unit 809.

A demodulating unit 811 cancels a phase noise based on the phase difference between the electric signal 808 from the delay unit 810 and the frequency component 812 of the unmodulated signal 802 extracted by the unmodulated component extracting unit 809, and demodulates the frequency-multiplexed signal 801.

A coherent SCM optical communication system is applied to the present invention having the configuration shown in FIG. 8.

In this case, plural sets of an electric stage modulating unit, a frequency multiplexing unit, another frequency multiplexing unit 803, and the light modulating unit 805 are provided. It further comprises a light multiplexing unit for multiplexing each of the modulated lights from each of the light modulating units and for outputting a resultant optical frequency multiplexed modulated light as the modulated light 806.

Besides, the present invention having the configuration shown in FIG. 8 can be applied to an optical communication system which is a light distributing network.

In this case, the above described local oscillating unit and mixing unit are provided in the repeater in the network. The modulated light 806 transmitted through the light transmission line of optical fibers, etc. is branched after being mixed with the local oscillator light by the above described mixing unit in the repeater. Each of the branched mixed light beams is received by a plurality of receivers of the above described light receiving element (a part of the light receiving unit 807), the unmodulated component extracting unit 809, the delay unit 810, and the demodulating unit 811. Furthermore, a light amplifier can be provided before and/or after the branch in the repeater.

The present invention can further include a unique countermeasure to polarization.

In this case, the transmitter can comprise not only the above described local oscillating unit and the mixing unit, but also a polarization control unit for controlling the polarization state of the modulated light 806 to be equivalent to the polarization state of the locally oscillator light from the local oscillating unit. The modulated light 806 and the local oscillator light are controlled by the polarization control unit to indicate the coincident polarization state, and are mixed by the mixing unit from which the mixed light is transmitted to the receiver through the light transmission line. The transmitter can comprise a light amplifier for light-amplifying the mixed light from the mixing unit and transmitting it to the light transmission line.

The above configuration can be applied to an optical communication system which is a light distributing network. At this time, the mixed light transmitted from the transmitter to the light transmission line is branched by the repeater in the network. Each of the branched mixed light beams is received by each receiver. As described above, a light amplifying unit can be provided before and/or after the branch in the repeater.

In the configuration of the present invention having the configuration above, the frequency-multiplexed signal 801 is multiplexed, before being light-modulated, with the unmodulated signal 802 which is used for phase comparison and has a frequency out of the frequency band of the frequency-multiplexed signal 801.

Figure 10:
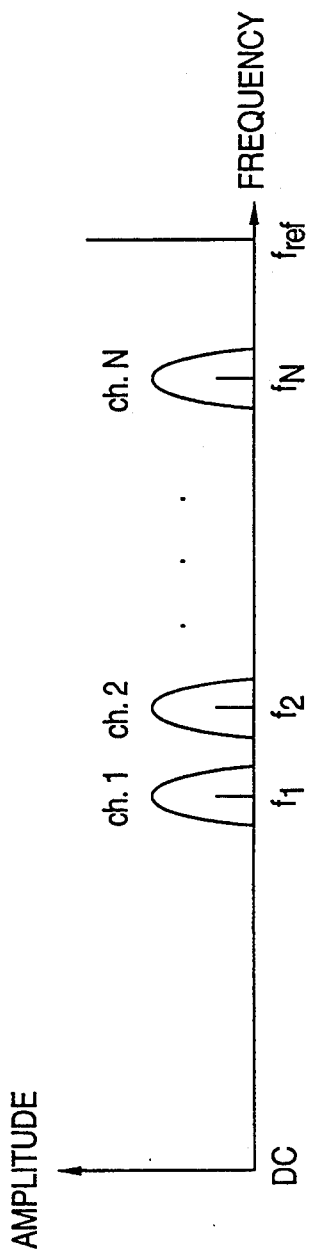
FIG. 10 shows the configuration of frequencies in the electric stage when the present invention is applied to a coherent SCM optical communication system.

For example, the frequency-multiplexed signal 801 comprising the data signal component in a plurality of channels ch. 1 through ch. N which is frequency-multiplxed based on each carrier of frequencies $f_1$–$f_N$ shown in FIG. 10 is multiplexed with the frequency component of the unmodulated signal 802 having the frequency $f_{ref}$.

In a phase noise canceling method of the present invention, the frequency component 812 in the above described unmodulated signal 802 is regenerated, from the electric signal 808 received by the light receiving unit 807, by the unmodulated component extracting unit 809 which can be configured by a simple circuit comprising a band-pass filter, etc. Then, phase noise can be canceled by phase-comparing the frequency component with the received electric signal 808.

That is, if the present invention includes the optical heterodyne or homodyne detection, the feature of the present invention resides in that the phase comparison in the phase noise canceling process is performed not with the main carrier component but with the unmodulated subcarrier component exclusively used for the phase comparison.

Thus, if the present invention includes the optical heterodyne or homodyne detection, the frequency component 812 in the unmodulated signal 802 must be regenerated in the phase noise canceling process, without need of receiving the component in a broad frequency band from the frequency component of the frequency-multiplexed signal 801 to the main carrier component. Therefore, a broadband circuit is not required in the light receiving unit 807, and the total cost for the whole system can be reduced to a great extent.

Furthermore, when the present invention includes the optical heterodyne or homodyne detection, the demodulating function is not affected at all in the demodulating unit 811 as long as the delay time in the delay unit 810 equals the signal delay time in the unmodulated component extracting unit 809 although the frequency of the main carrier component is changed, that is, the center light frequency of a modulated light 806 or the frequency of a local oscillator light is changed. Accordingly, the requirements for the oscillation frequency of the local oscillating unit or the light modulating unit 805 can be considerably reduced, thereby minimizing the cost for the whole system.

Additionally in an SCM optical communication system to which the present invention is applied, the channel interval (frequency interval) of each transmission signal multiplexed at a microwave level in the sending equipment can be reduced to approximately the double each data transmission rate. Thus, the receiving equipment collectively receives all or a plurality of channels without need of a broadband receiver, thereby greatly increasing the number of receiving channels at a low cost.

If the present invention in which the optical heterodyne or homodyne detection is performed is applied to an optical communication system of a light distributing network, a local oscillating unit and a mixing unit are provided in a repeater when the repeater (distributor) is only a few kilometers apart from each of the receivers, thereby transmitting to each receiver according to the branches of fibers a mixed light obtained by mixing a modulated light and a local oscillator light in the distributor directly. As a result, a specific mixing unit (specifically, a local oscillator LD) is not required at each receiver, thereby considerably reducing the cost for each receiver and practically realizing a light distributing network through a low-cost coherent SCM optical communication system.

If the deterioration of the receiving sensitivity must be reduced to the greatest possible extent, the branch loss should be compensated by the light amplifier provided before or after the light branch.

Furthermore, a precise polarization control can be realized in the sending equipment by providing a local oscillating unit, a mixing unit, and a polarization controlling unit in the transmitter in the configuration of the present invention where the optical heterodyne or homodyne detection is performed. These features can be conspicuously effective in a light distribution network having a comparatively short distance between the transmitter and each receiver. However, a system margin can be improved by providing a light amplifier as a light post-amplifier in the output unit of the transmitter or by providing a light amplifier before or after a light branch in the repeater as described above, thereby extending the potential transmission distance and increasing the number of branches.

Explanation of the first embodiment

Figure 11:
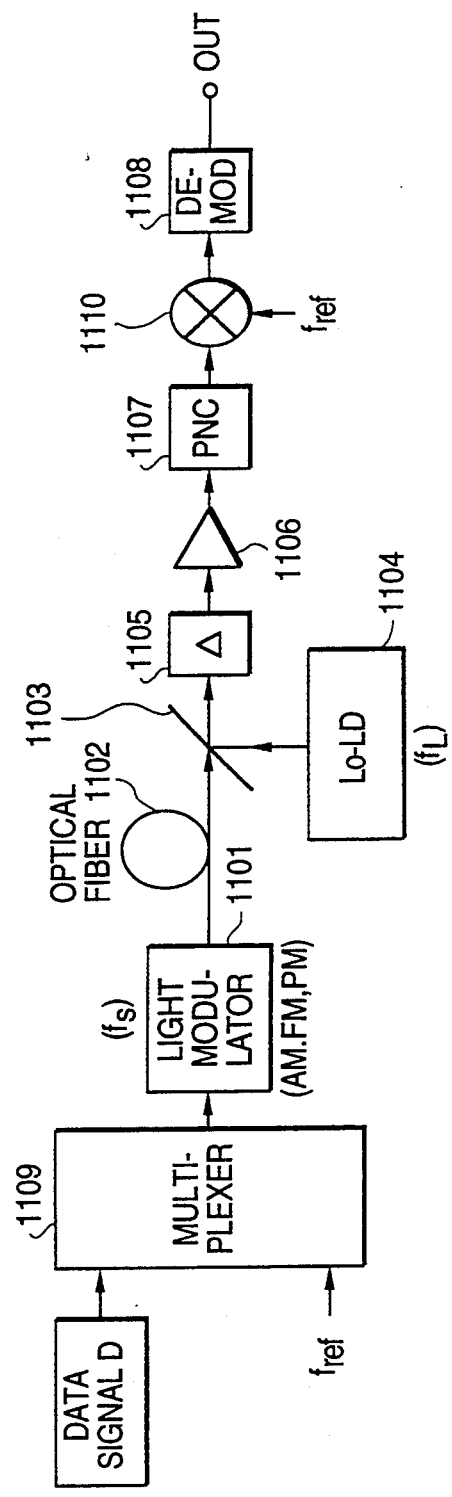
FIG. 11 shows the configuration of the first embodiment of the present invention.

FIG. 11 shows the configuration of the first embodiment of the present invention. It shows the system configuration of the common coherent optical communication system based on which the present invention is configured, and corresponds to the prior art technology shown in FIG. 1.

In FIG. 11, a light modulator 1101, an optical fiber 1102, a mixing circuit 1103, an Lo-LD 1104, a light detector 1105, an amplifier 1106, and a demodulating circuit (DEMOD) 1108 correspond to the units 101–108 shown in FIG. 1 respectively, and have the similar functions.

First, the sending equipment is explained below.

The configuration shown in FIG. 11 is different from that shown in FIG. 1 in the modulated signal applied to the light modulator 1101. That is, as shown in FIG. 11, a multiplexer 1109 multiplexes to a data signal D, having a predetermined transmission rate as a communication signal in the base band, an unmodulated subcarrier signal which is used for phase comparison and has the frequency $f_{ref}$ higher than that of the main lobe in the frequency component. This is the most important feature of the present invention.

Figure 9:
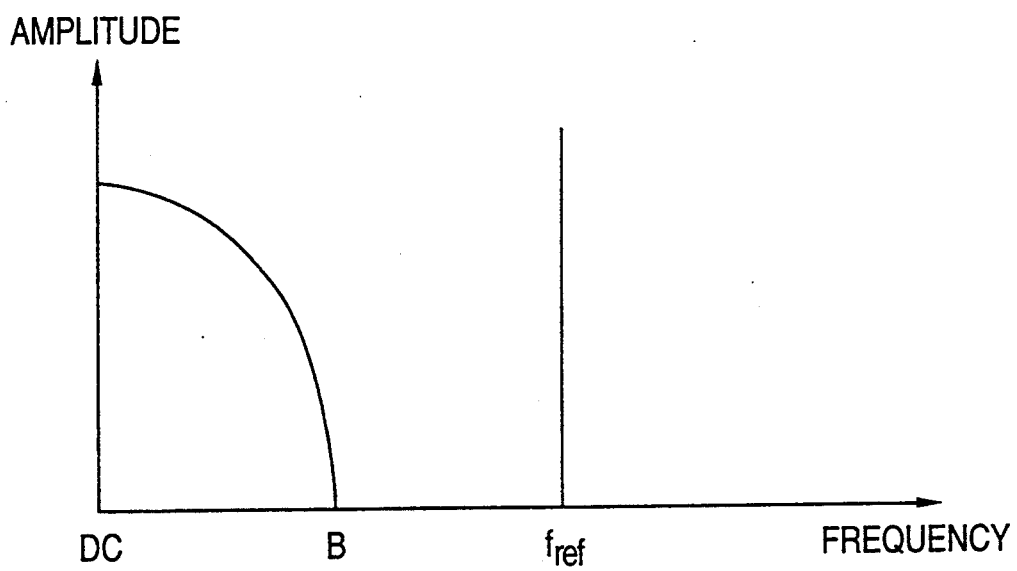
FIG. 9 shows the configuration of frequencies in the electric stage when the present invention is applied to a coherent optical communication system.

Thus, FIG. 9 shows the frequency characteristics of an output signal obtained by the multiplexer 1109. The data signal D only has to be provided with the main lobe of the frequency component. Therefore, the high frequency component other than the main lobe in its frequency component is preferrably removed from the data signal D by a low pass filter before the signal is multiplexed by the multiplexer 1109. Otherwise, the frequency $f_{ref}$ of a subcarrier signal multiplexed by the multiplexer 1109 is set to a sufficiently high frequency.

The light modulator 1101 modulates a carrier light having the light frequency $f_s$ according to an output signal obtained by the multiplexer 1109 as described above. The light modulating method can be any of the AM, FM, and PM methods. The carrier light can be, as in the case of the prior art technology shown in FIG. 1, a laser light obtained by a semiconductor laser, etc.

The modulated light obtained by the light modulator 1101 is transmitted through the optical fiber 1102.

Next, the receiving equipment is explained below.

The configuration in which the modulated light transmitted through the optical fiber 1102 is optical-heterodyne-detected with the mixing circuit 1103, the Lo-LD 1104, and the light detector 1105 is the same as the configuration of the prior art technology shown in FIG. 1.

An intermediate frequency signal obtained by the light detector 1105 is amplified by the amplifier 1106, and applied to a PNC 1107 where phase noises contained in the intermediate frequency signal can be canceled.

After canceling the phase noises, the intermediate frequency signal is applied to a multiplier 1110, where the intermediate frequency signal is multiplied by a signal having the frequency $f_{ref}$, and the intermediate frequency is shifted to the frequency in the base band and demodulated by the DEMOD 1108.

Figure 3:
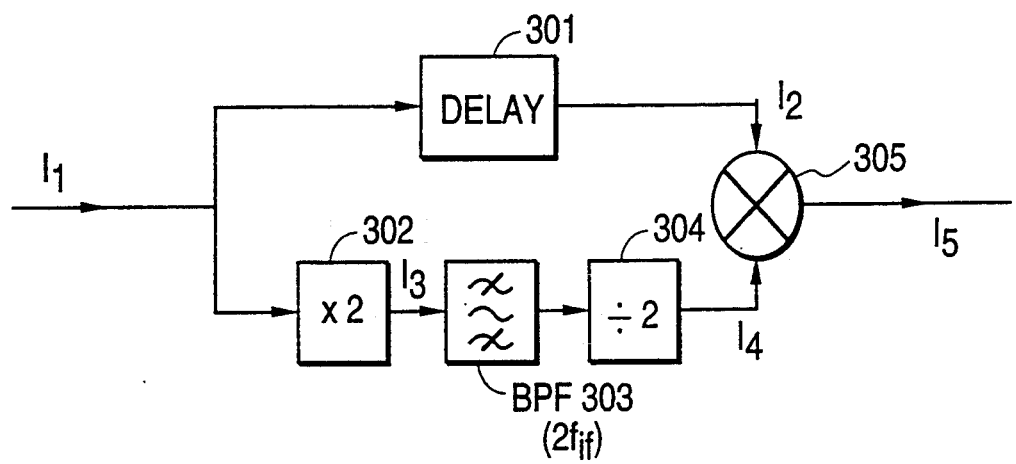
FIG. 3 (Prior Art) shows the configuration of the PNC in the conventional coherent optical communication system.
Figure 7:
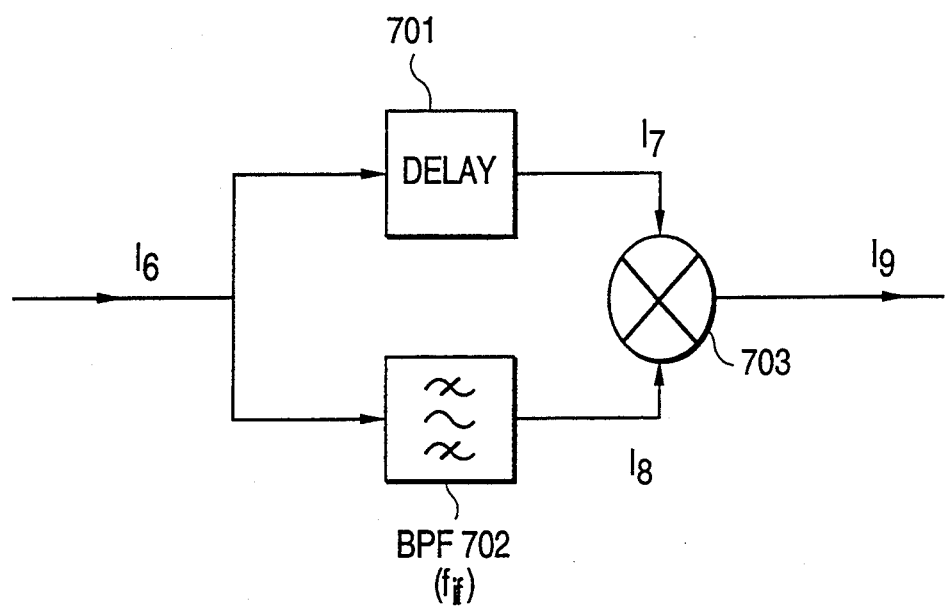
FIG. 7 (Prior Art) shows the configuration of the PNC in the conventional coherent SCM optical communication system.
Figure 12:
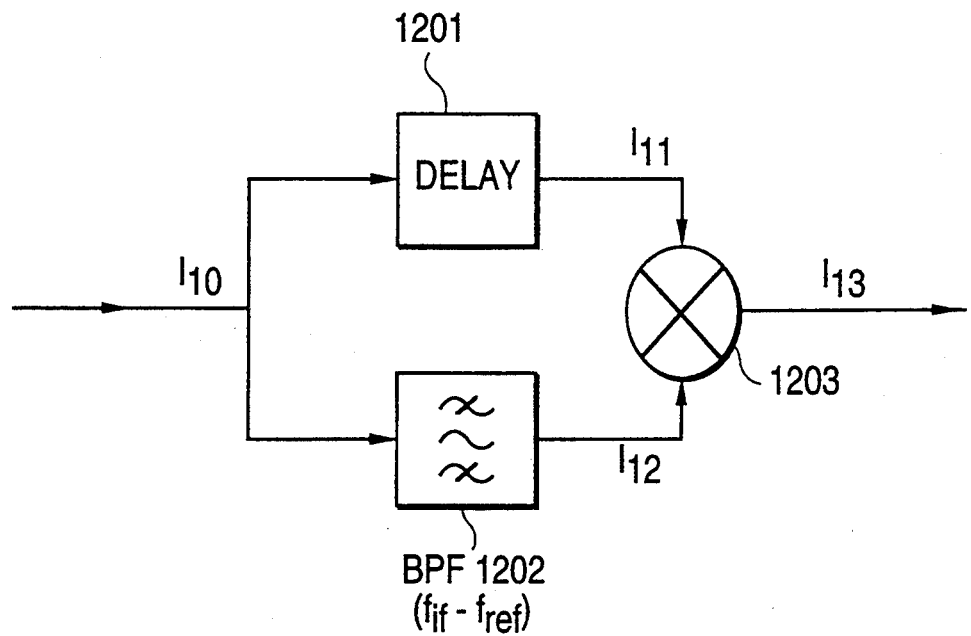
FIG. 12 shows the configuration of the PNC in the first embodiment.

FIG. 12 shows the configuration of the PNC 1107 shown in FIG. 11. As shown in FIG. 12, an unmodulated subcarrier component having the frequency $f_{if}\text{-}f_{ref}$ is regenerated from the received intermediate frequency signal, and the phase comparison is performed between the subcarrier component and the received intermediate frequency signal, thereby canceling phase noises. That is, the feature of the present invention resides in that the phase comparison is not performed with the main carrier component as shown in FIG. 3 or 7 but with the unmodulated subcarrier component exclusively used for the phase comparison process.

In FIG. 12, the received intermediate frequency signal is branched to two routes. In the first route, the received intermediate frequency signal is delayed by a delay circuit 1201. In the second route, the unmodulated subcarrier component having the frequency $f_{if}\text{-}f_{ref}$ can be extracted by a band-pass filter 1202. Then, an output signal in each route is mixed in a multiplier 1203, thereby generating the intermediate frequency signal with phase noises canceled.

The principle of the phase noise canceling method according to the configuration shown in FIG. 12 is explained below. The explanation describes how the light modulator 1101 shown in FIG. 11 modulates a light in the PM method. In the following equations, $A_9$, $A_9'$, $A_{10}$, and $A_{11}$ indicates predetermined constants.

An intermediate frequency signal $I_{10}$ applied from the amplifier 1106 shown in FIG. 11 can be represented by the following equation (14).

$$I_{10} = A_9\cos\{2\pi f_{if}t + \theta(t) + \phi(t)\} + \quad (14)$$
$$A_9'\cos\{2\pi(f_{if} - f_{ref})t + \phi(t)\}$$

where $\theta(t)$ indicates a phase component corresponding to a data signal D light-modulated by the PM method. $\phi(t)$ indicates a phase noise to be canceled.

The intermediate frequency signal $I_{10}$ is branched to two routes.

First, an intermediate frequency signal $I_{11}$ delayed by the delay circuit 1201 in the first route can be represented by the following equation (15) according to equation (14).

$$I_{11} = A_9\cos\{2\pi f_{if}(t - \Delta t_1) + \theta(t - \Delta t_1) + \phi(t - \Delta t_1)\} + \quad (15)$$
$$A_9'\cos\{2\pi(f_{if} - f_{ref})(t - \Delta t_1) + \phi(t - \Delta t_1)\}$$

where $\Delta t_1$ indicates a delay time in the delay circuit 1201.

The BPF 1202 in the second route passes only the frequency component $f_{if}\text{-}f_{ref}$ close to the frequency of the unmodulated subcarrier component. The intermediate frequency signal $I_{12}$ outputted therefrom can be represented by the following equation according to equation (14).

$$I_{12} = A_{10}\cos\{2\pi(f_{if}\text{-}f_{ref})t + \phi(t)\}$$

where a time delay arises when an intermediate frequency signal is transmitted through the BPF 1201. In consideration of the time delay, an output $I_{12}$ of the BPF 1201 can be represented by the following equation (16) according to the equation above, where $\Delta_2$ indicates the time delay.

$$I_{12} = A_{10}\cos\{2\pi(f_{if} - f_{ref})(t - \Delta t_2) + \phi(t - \Delta t_2)\} \quad (16)$$

As described above, an intermediate frequency signal $I_{12}$, which is an unmodulated subcarrier component, can be regenerated from the second route.

Then, the intermediate frequency signal $I_{12}$ is multiplied by the multiplier 1203 by the intermediate frequency signal $I_{11}$ delayed by the delay circuit 1201 in the first route. In the resultant output signals, a component $I_{13}$ in the detection band can be represented by the following equation (17) according to the above equations (15) and (16).

$$I_{13} = A_{11}\cos\{2\pi(f_{if} - f_{ref})(\Delta t_1 - \Delta t_2) - \quad (17)$$
$$2\pi f_{ref}(t - \Delta t_1) - \theta(t - \Delta t_1) + \Delta\phi(\Delta t_1 - \Delta t_2)\}$$

where $\Delta\phi(\Delta t_1 - \Delta t_2)$ and $\sigma^2$ can be obtained in the same manner as in equations (6) and (7) shown in FIG. 3 of the prior art technology. Therefore, as in the case shown in FIG. 3, the phase noise component $\Delta\phi(\Delta t_1 - \Delta t_2)$ can be set to 0 by controlling the delay circuit 1021 such that the delay time $\Delta t_1$ in the delay circuit 1201 equals the time delay $\Delta t_2$ in the BPF 1202. Accordingly, the output $I_{13}$ from the multiplier 1203 shown in equation (17) above can be represented by the following equation (18).

$$I_{13} = A_{11}\cos\{-2\pi f_{ref}(t - \Delta t_1) + \theta(t - \Delta t_1)\} \quad (18)$$

The intermediate frequency signal $I_{13}$ is applied to the multiplier 1110 shown in FIG. 11. In the multiplier 1110, a signal having the frequency $f_{ref}$ is multiplied by the above described intermediate frequency signal $I_{13}$, and the intermediate frequency is shifted to the frequency in the base band. According to the thus obtained signal, the DEMOD 1108 demodulates the data signal D.

Thus, in the first embodiment of the present invention having the configuration shown in FIGS. 11 and 12, only an unmodulated subcarrier component of the frequency $f_{if}\text{-}f_{ref}$ in the PNC 1107 must be regenerated as shown in equations (14)-(18). Therefore, the optical heterodyne detecting circuit comprising the mixing circuit 1103, the Lo-LD 1104, the light detector 1105, and the amplifier 1106 shown in FIG. 11 only has to be provided with a circuit for exclusively receiving subcarrier components without need of a conventional broadband circuit required for receiving main carrier components. As a result, a total cost for the whole system can be considerably reduced.

In equation (17), the frequency $f_{if}$ indicates the difference frequency $f_s - f_L$ between the center light frequency $f_s$ of the modulated light generated by the light modulator 1101 and the light frequency $f_L$ of the local oscillator light obtained by the Lo-LD 1104. The intermediate frequency signal $I_{13}$, which is a demodulated signal, output from the multiplier 1203 is not affected at all according to equation (17) as long as the delay time $\Delta t_1$ in the delay circuit 1201 equals the time delay $\Delta t_2$ in the BPF 1202 although the frequency $f_{if}$ is changed, that is, the center light frequency $f_s$ of an modulated light generated by the light modulator 1101 or the light frequency $f_L$ in the local oscillator light obtained by the Lo-LD 1104 is changed. Accordingly, the requirements for the oscillation frequency of the light modulator 1101 and the local generator 1104 can be reduced to a great extent, thereby reducing the total cost for the whole system.

In the first embodiment of the present invention having the configuration shown in FIGS. 11 and 12, the modulated light transmitted through the optical fiber 1102 is obtained by directly modulating only one carrier light. However, it can be obtained by light-frequency-multiplexing (wavelength-multiplexing) data signals in a plurality of channels using a number of carrier lights having different frequencies (wavelengths).

Explanation of the second embodiment

Figure 13:
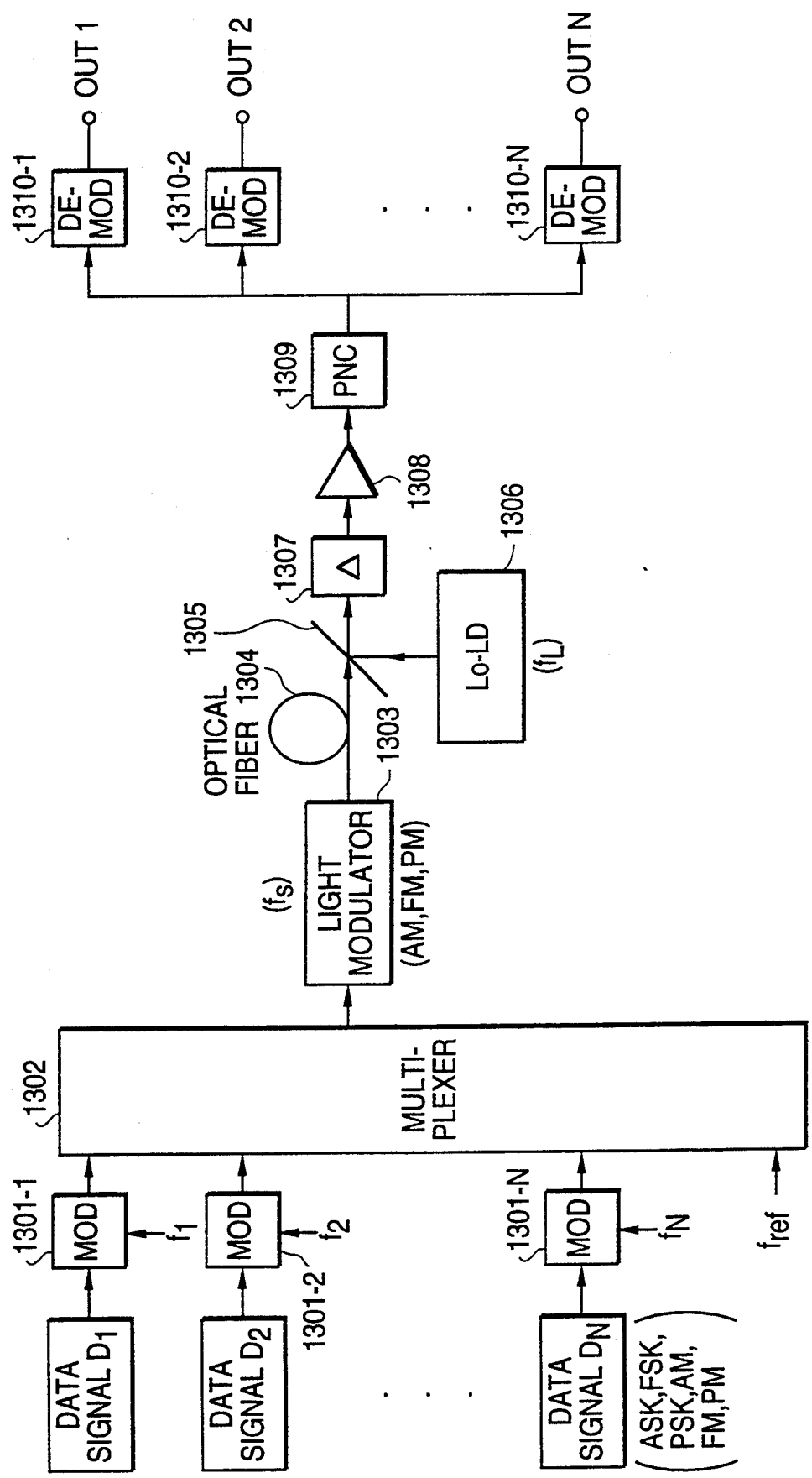
FIG. 13 shows the configuration in the second embodiment of the present invention.

FIG. 13 shows the configuration of the second embodiment of the present invention. It shows the system configuration of the coherent SCM optical communication system to which the present invention is applied, and corresponds to the prior art technology shown in FIG. 4.

Figure 4:
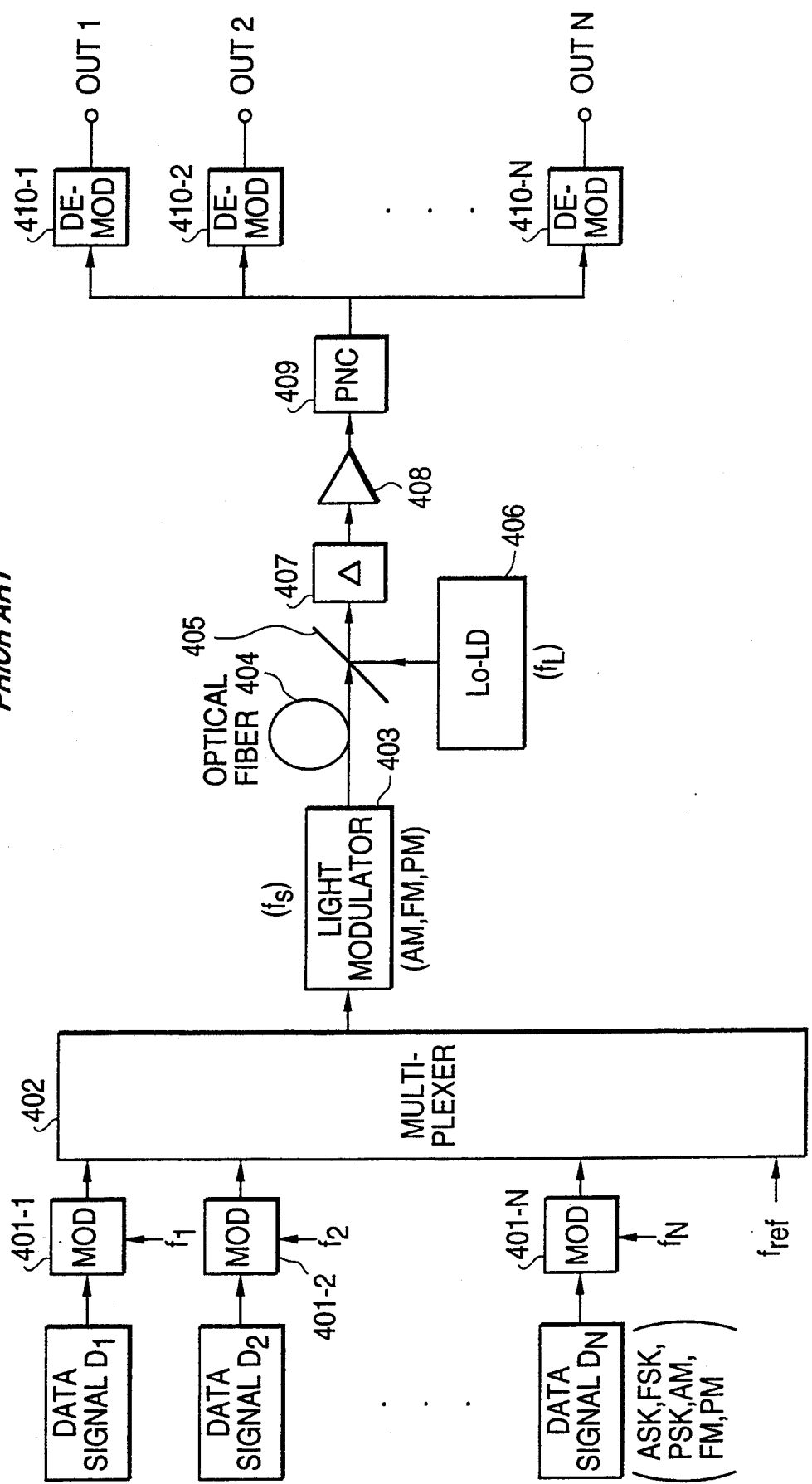
FIG. 4 (Prior Art) shows the configuration of conventional coherent SCM optical communication system capable of canceling phase noises.
Figure 5:
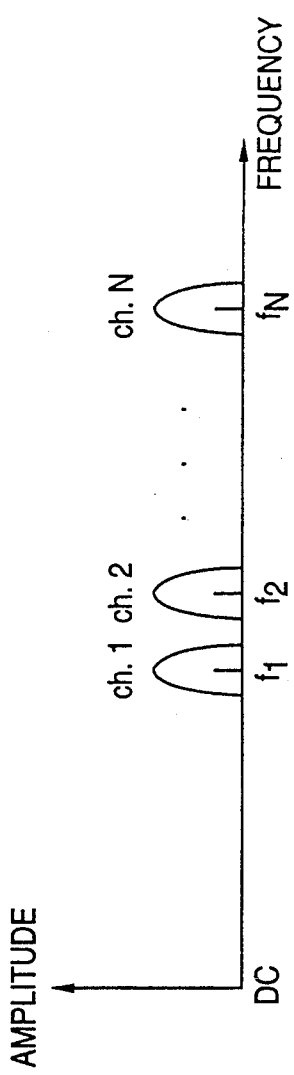
FIG. 5 (Prior Art) shows the configuration of channels of an SCM signal in the conventional coherent SCM optical communication system.
Figure 6:
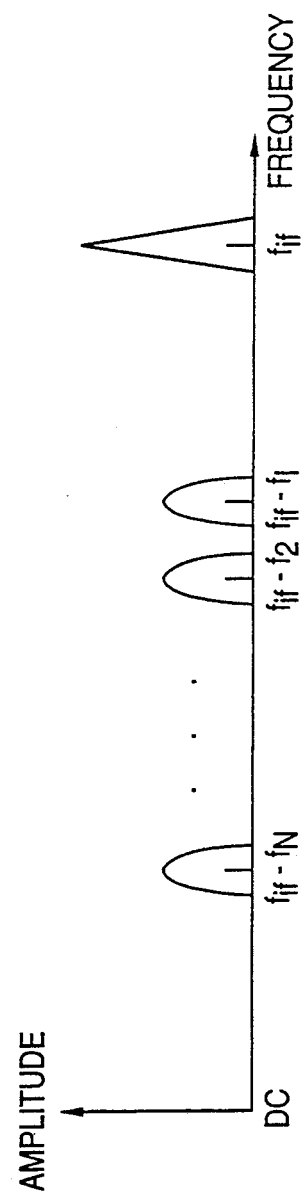
FIG. 6 (Prior Art) shows the spectrum in the IF stage in the conventional coherent SCM optical communication system.

In FIG. 13, modulators 1301-1–1301-N, a multiplexer 1302, a light modulator 1303, an optical fiber 1304, a mixing circuit 1305, an Lo-LD 1306, a light receiver 1307, an amplifier 1308, and a demodulating circuit (DEMOD)1310-1–1310-N respectively correspond to the units 401-1–401-N, 402-409, 410-1–410-N shown in FIG. 4, and they have similar functions respectively.

First, the sending equipment is explained below.

The configuration shown in FIG. 13 differs from that shown in FIG. 4 in the modulated signal applied to the light modulator 1101. That is, in FIG. 13 as in FIG. 4, each of the modulators 1301-1–1301-N modulates each carrier having a different frequency $f_1$–$f_N$ and assigned to each channel according to each of the data signals $D_1$–$D_N$. Resultant channel signals are composed by the multiplexer 1302. At this time, the multiplexer 1302 multiplexes an unmodulated subcarrier signal of 1 channel together with the above described N channel signals as in the case shown in FIG. 11. This is the most important feature of the present invention.

The assignment of channels on the frequency axis of subcarrier signals (SCM signals) obtained by the multiplexer 1302 can be indicated in FIG. 10.

The frequency interval between adjacent channels of each channel signal, as in the case of a prior art technology shown in FIG. 4, can be set in each filtering process to double each data transmission rate at minimum for digital signals.

Furthermore, in the light modulator 1303, a carrier light having the light frequency $f_s$ is modulated according to an SCM signal outputted from the multiplexer 1302. The light modulating method can be the AM, FM, or PM method. The carrier light can be, as in the case of the prior art technology shown in FIG. 1 or 4, a laser light obtained from a semiconductor laser, etc.

The modulated light obtained by the light modulator 1303 is transmitted through the optical fiber 1304.

The receiving equipment is explained below.

The configuration in which the modulated light transmitted through the optical fiber 1304 is optical-heterodyne-detected by the mixing circuit 1305, the Lo-LD 1306, and the light detector 1307 is the same as that of each prior art technology shown in FIGS. 1 or 4.

The intermediate frequency signal obtained by the light detector 1307 is amplified by the amplifier 1308 and applied to the PNC 1309 where phase noises contained in the intermediate frequency signal can be canceled.

After canceling phase noises, the intermediate frequency signal is branched for the number of channels. Each of the demodulators 1310-1–1310-N extracts each subcarrier component close to each center frequency of $f_{ref}$-$f_1$, $f_{ref}$-$f_2$, ..., $f_{ref}$-$f_N$ from the above described branched intermediate frequency signal, and then demodulates each of the data signals $D_1$–$D_N$.

Figure 14:
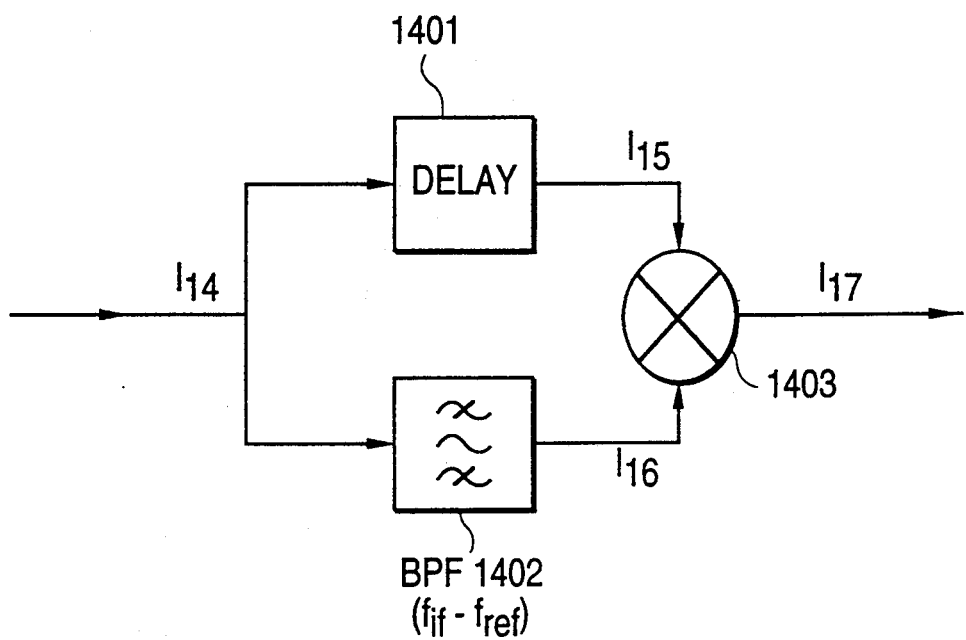
FIG. 14 shows the configuration of the PNC in the second embodiment.

FIG. 14 shows the configuration of the PNC 1309 shown in FIG. 13, and shows the same configuration as that of the first embodiment shown in FIG. 12. In the second embodiment, as in the case of the coherent optical communication system shown in FIG. 12, an unmodulated subcarrier component having the frequency $f_{if}$-$f_{ref}$ is extracted from the received intermediate frequency signal. Then, the phase comparison is performed between the subcarrier component and the received intermediate frequency signal, thereby canceling phase noise.

In FIG. 14, as in FIG. 12, the received intermediate frequency signal is branched to two routes. In the first route, the received intermediate frequency signal is delayed by a delay circuit 1401. In the second route, an unmodulated subcarrier component having the frequency $f_{if}$-$f_{ref}$ is extracted by a band-pass filter 1402. An input signal in each route is mixed by a multiplier 1403, thereby obtaining the intermediate frequency signal with phase noise canceled.

The principle of the phase noise canceling method based on the configuration shown in FIG. 14 is explained below. The following explanation describes how the light modulator 1303 shown in FIG. 13 modulates a light in the PM method. In the following equations, $A_{12}$, $A_{12}'$, $A_{12}''$, $A_{13}$, and $A_{14}$ indicate predetermined constants.

An intermediate frequency signal $I_{14}$ applied by the amplifier 1308 shown in FIG. 13 can be represented by the following equation (19).

$$I_{14} = A_{12}J_1(m) \sum_{i=1}^{N} \cos\{2\pi(f_{if} - f_i)t - D_i(t) + \phi(t)\} + \\ A_{12}'J_1(m)\cos\{2\pi(f_{if} - f_{ref})t + \phi(t)\} + \\ A_{12}''J_0(m)\cos\{2\pi f_{if}t + \phi(t)\} \quad (19)$$

As described above, $D_i$ ($1 \leq i \leq N$) indicates a data signal in each channel, $f_{if}$ indicates a main carrier frequency in the IF stage, $f_i$ ($1 \leq i \leq N$) indicates a carrier frequency in the electric stage corresponding to each channel (refer to FIG. 10), $f_{ref}$ indicates an unmodulated carrier frequency in the electric stage, ($f_{if}$-$f_i$) indicates a subcarrier frequency modulated by the data signal $D_i$ in the IF stage, ($f_{if}$-$f_{ref}$) indicates an unmodulated subcarrier frequency in the IF stage, m indicates a PM modulation index, $\phi(t)$ indicates a phase noise to be canceled, and Jn (n=0,1) indicates the n-th order Bessel function of the first kind.

The intermediate frequency signal $I_{14}$ is branched to two routes.

First, an intermediate frequency signal $I_{15}$ delayed by the delay circuit 1401 in the first route can be represented by the following equation (20) according to equation (19).

$$I_{15} = A_{12}J_1(m) \sum_{i=1}^{N} \cos\{2\pi(f_{if} - f_i)(t - \Delta t_1) - \\ D_i(t - \Delta t_1) + \phi(t - \Delta t_1)\} + \\ A_{12}'J_1(m)\cos\{2\pi(f_{if} - f_{ref})(t - \Delta t_1) + \phi(t - \Delta t_1) + \\ A_{12}''J_0(m)\cos\{2\pi f_{if}(t - \Delta t_1) + \phi(t - \Delta t_1)\} \quad (20)$$

where $_{t1}$ indicates the delay time in the delay circuit 1401 as in the case shown in FIG. 12.

The BPF 1402 in the second route passes only the frequency component $f_{if}$-$f_{ref}$ close to the frequency of the unmodulated subcarrier component. An intermediate frequency signal $I_{16}$ outputted therefrom can be represented by the following equation according to equation 19.

$$I_{16} = A_{13}J_1(m) \cos\{2\pi(f_{if} - f_{ref})t + \phi(t)\}$$

where a time delay arises when an intermediate frequency signal is transmitted through the BPF 1402. In consideration of the time delay, an output $I_{16}$ of the BPF 1402 can be represented by the following equation (21) according to the equation above, where $\Delta t_2$ indicates the time delay.

$$I_{16} = A_{13}J_1(m)\cos\{2\pi(f_{if} - f_{ref})(t - \Delta t_2) + \phi(t - \Delta t_2)\} \quad (21)$$

As described above, an intermediate frequency signal $I_{16}$, which is an unmodulated subcarrier component, can be regenerated from the second route.

Then, the intermediate frequency signal $I_{16}$ is multiplied by the multiplier 1403 by the intermediate frequency signal $I_{15}$ delayed by the delay circuit 1401 in the first route. In the resultant output signals, a component $I_{17}$ in the detection band can be represented by the following equation (22) according to the above equations (20) and (21).

$$I_{17} = A_{14}\Sigma\cos\{2\pi(f_{if} - f_{ref})(\Delta t_1 - \Delta t_2) - \\ 2\pi(f_{ref} - f_i)(t - \Delta t_1) + D_i(t - \Delta t_1) - \Delta\phi(\Delta t_1 - \Delta t_2)\} \quad (22)$$

where $\Delta\phi(\Delta t_1 - \Delta t_2)$ and $\sigma^2$ distributed therefrom can be obtained in the same manner as in equations (6) and (7) shown in FIG. 3. Therefore, as in the case shown in FIG. 3, the phase noise component $\Delta\phi(\Delta t_1 - \Delta t_2)$ can be set to 0 by controlling the delay circuit 1401 such that the delay time $\Delta t_1$ in the delay circuit 1402 equals the time delay $\Delta t_2$ in the BPF 1402. Accordingly, the output $I_{17}$ from the multiplier 1403 shown in equation (22) above can be represented by the following equation (23).

$$I_{17} = A_{14}\Sigma\cos\{-2\pi(f_{ref} - f_i)(t - \Delta t_1) + D_i(t - \Delta t_1)\} \quad (23)$$

where the intermediate frequency signal $I_{17}$ is applied to each of the DEMODs 1310-1–1310-N shown in FIG. 13, thereby demodulating the data signal $D_i$ with phase noise canceled.

Thus, in the second embodiment of the present invention having the configuration shown in FIGS. 13 and 14, as in the first embodiment, only a subcarrier component in the PNC 1309 must be extracted as shown in equations (19)–(23). Therefore, the present invention requires no broadband circuits used in the prior art technology for extracting a main carrier.

In equation (22), as in equation (17), the intermediate frequency signal $I_{17}$, which is a demodulated signal, output from the multiplier 1403 is not affected at all as long as the delay time $\Delta t_1$ in the delay circuit 1401 equals the time delay $\_t_2$ in the BPF 1402 although the frequency $f_{if}$ is changed, that is, the center light frequency $f_s$ of an modulated light generated by the light modulator 1303 or the light frequency $f_L$ in the local oscillator light obtained by the Lo-LD 1306 is changed.

Especially, if the present invention is applied to a coherent SCM optical communication system, the channel interval can be reduced in the sending equipment for double the data transmission rate. Therefore, all or a plurality of channels can be collectively received in the receiving equipment without a broadband receiver, thereby largely increasing the number of receivable channels at a low cost.

In the second embodiment of the present invention having the configuration shown in FIGS. 13 and 14, the modulated light transmitted through the optical fiber 1304 is obtained by directly modulating only one carrier light according to a microwave multiplexing signal for a plurality of channels. However, it can be obtained by directly modulating a number of carrier lights having different frequencies (wavelengths) according to a microwave multiplexing signal for a plurality of channels, and by light-frequency-multiplexing (wavelength-multiplexing) these carrier lights.

Explanation of the third embodiment

Figure 15:
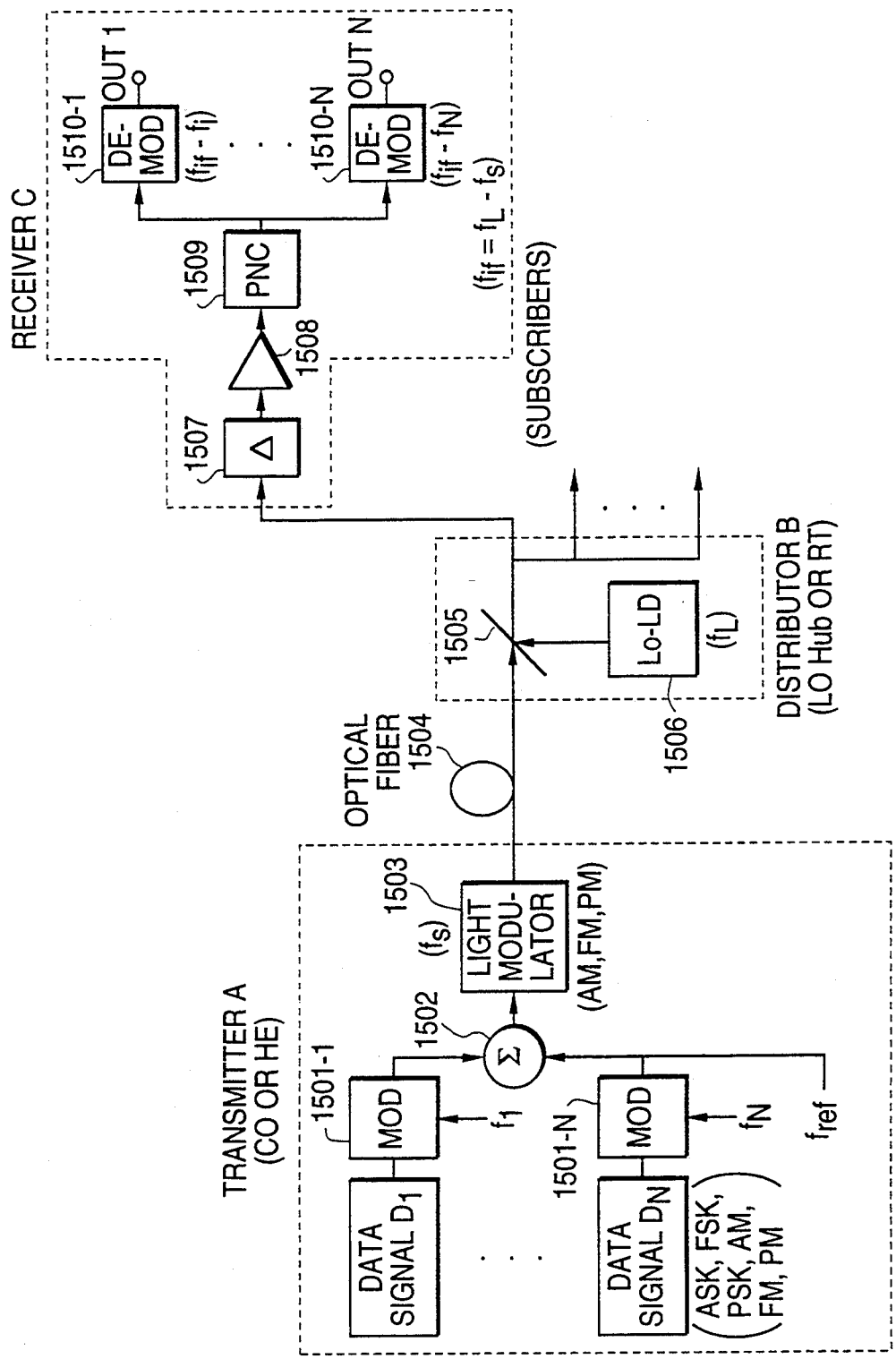
FIG. 15 shows the configuration of the third embodiment of the present invention.

FIG. 15 shows the configuration of the third embodiment of the present invention. It shows the system configuration in which the present invention is applied to a light distributing network through a coherent SCM optical communication system.

In a transmitter A such as a central office (CO) and a head end (HE) shown in FIG. 15, a modulator (MOD) 1501-1–1501-N, a multiplexer 1502, and a light modulator 1503 respectively correspond to the sending sides of the units 1301-1–1301-N, 1302, and 1303 in the coherent SCM optical communication system represented as the second embodiment shown in FIG. 13.

A light receiver 1507, an amplifier 1508, a PNC 1509, and demodulating circuits (DEMOD) 1510-1–1510-N in the receiver (subscriber) respectively correspond to the receiving sides of the units 1307, 1308, 1309, and 1310-1–1310-N.

Specifically, in the third embodiment, a plurality of receivers C are connected to optical fibers 1504 through the distributors (repeaters) B such as the local office (LO), the hub, and the remote terminal (RT).

Then, in the second embodiment shown in FIG. 13, the mixing circuit 1305 and the Lo-LD 1306 provided on the receiving side as shown in FIG. 13 respectively correspond to the units 1505 and 1506 shown in FIG. 15. Thus, they are provided in a pair in the distributor B for a plurality of receivers C.

In the above described configuration, a modulated signal from the light modulator 1503 in the transmitter A is led to the distributor B through the optical fibers 1504.

In the distributor B, a modulated light is mixed with a local oscillator light having the central light frequency of $f_L$ from the Lo-LD 1506. Then, the mixed light is branched and transmitted to each receiver C through the optical fibers.

In each receiver C, an intermediate frequency signal which is optical-heterodyne-detected from the light detector 1507 can be obtained. The intermediate frequency signal is amplified by the amplifier 1508 and applied to the PNC 1509 which has the same configuration as that shown in FIG. 14 for the second embodiment and cancels phase noises contained in an intermediate frequency signal.

After the cancellation of phase noises, the intermediate frequency signal is branched for the number of channels. Each of the demodulators 1510-1–1510-N extracts from each of the intermediate frequency signals as branched above each subcarrier component close to each of the center frequencies of $f_{ref}-f_1, f_{ref}-f_2, \ldots, f_{ref}-f_N$. Then, data signals $D_1-D_N$ are demodulated.

In a common optical heterodyne detection, a local oscillator (Lo-LD) is normally provided close to the light so as to maximize the power to be applied to the light detector. However, in an optical distribution system, a distributor B is located about a few kilometers apart from a receiver C, resulting in a-few-decibel loss (for a single mode fiber) caused by the optical transmission of a modulated signal.

Therefore, as in the third embodiment, the Lo-LD 1506 is provided in the distributor B so that the mixed light obtained by mixing the modulated light with the locally generated light in the distributor B can be directly transmitted to the receiver C through fiber branches. If the deterioration in the receiving sensitivity must be minimized, the branch loss should be compensated by a light amplifier provided before or after a light branch.

Thus, in the third embodiment, a signal light and a local oscillator light can be collectively mixed for a plurality of receivers C by a single Lo-LD 1506 provided in the distributor B. Therefore, the cost per receiver can be much reduced, and a light distributing network can be realized through a low-cost coherent SCM optical communication system.

If the present invention is applied to a coherent SCM optical communication system, the channel interval can be reduced in the sending equipment for double the data transmission rate. Therefore, all or a plurality of channels can be collectively received in the receiving equipment without a broadband receiver, thereby largely increasing the number of receivable channels at a low cost in a light distributing network.

In the third embodiment of the present invention having the configuration shown in FIG. 15, the modulated light transmitted through the optical fiber 1504 is obtained by directly modulating only one carrier light according to a microwave multiplexing signal for a plurality of channels. However, as in the second embodiment, it can be obtained by directly modulating a number of carrier lights having different frequencies (wavelengths) according to a microwave multiplexing signal for a plurality of channels, and by light-frequency-multiplexing (wavelength-multiplexing) these carrier lights. In the above described configuration, the number of receivable channels can be further increased.

Explanation of the fourth embodiment

Figure 16:
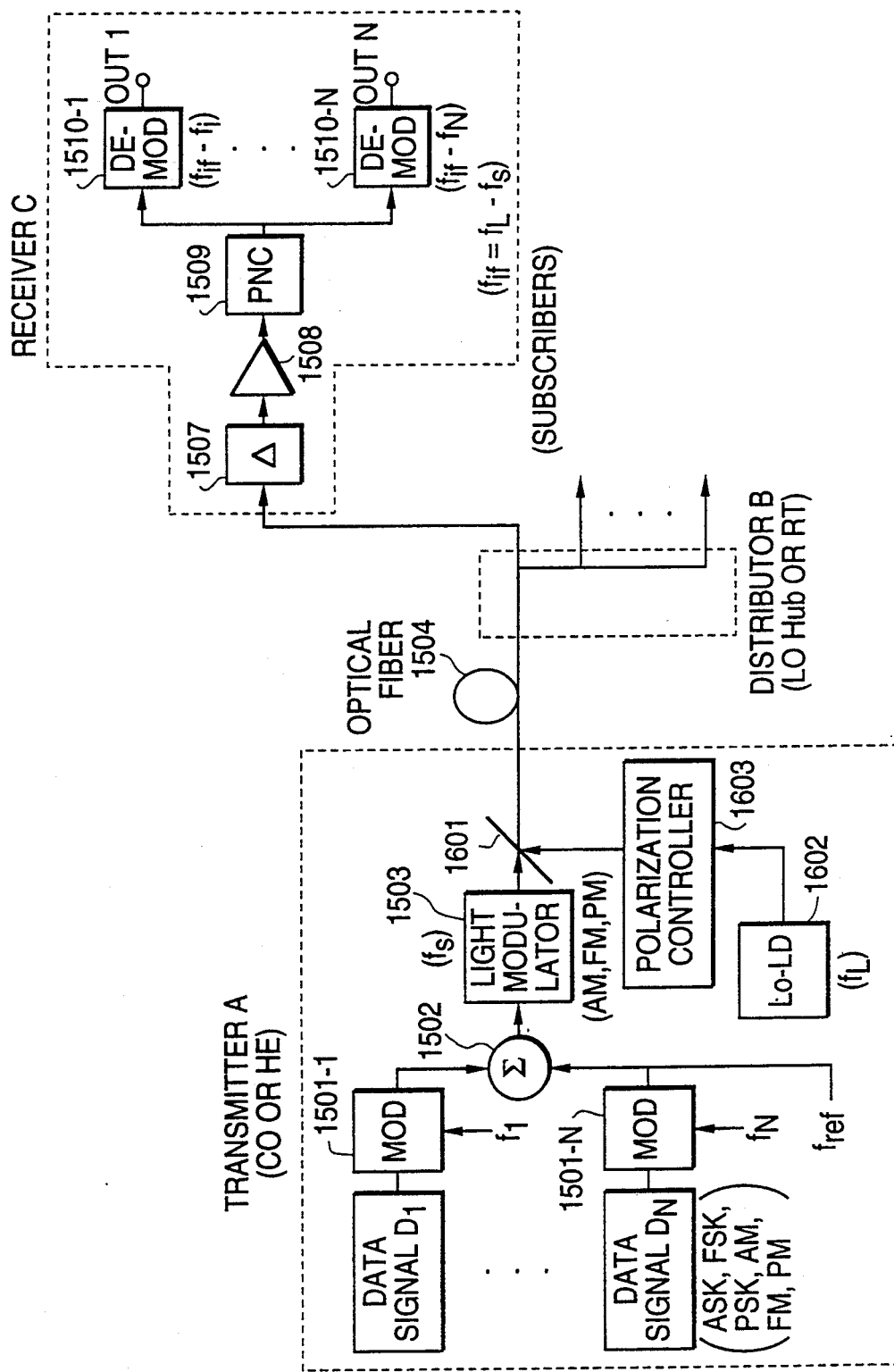
FIG. 16 shows the configuration of the fourth embodiment of the present invention.

FIG. 16 shows the configuration of the fourth embodiment of the present invention. As in the third embodiment shown in FIG. 15, it shows the system configuration in which the present invention is applied to a light distributing network through a coherent SCM optical communication system. Specifically, the configuration includes a countermeasure to polarization.

Before explaining the fourth embodiment shown in FIG. 16, a common countermeasure to polarization through the optical heterodyne detection is considered.

To perform an optical heterodyne detection, the polarization of the modulated light must coincide with that of the local oscillator light. If they are not coincident, the detection cannot be performed at all when they are linear polarization orthogonal to each other.

The countermeasures to the problems are given as follows.

(1) Polarization maintaining fibers are used for transmission fibers.

(2) A polarization diversity reception method is applied.

(3) A polarization active control reception method is applied.

(4) A polarization scrambling method is applied.

Among the above listed measures, measure (1) is not applicable because polarization maintaining fibers are expensive, and the already mounted optical fibers become inapplicable.

Measure (2) is effective in a common coherent optical transmission system, but it requires each subscriber have two receivers in a coherent SCM optical communication system, and thus is expensive. Besides, when Lo-LD and a receiver are mounted apart (refer to the third embodiment shown in FIG. 15), it is difficult to feed back to a Lo-LD an intermediate frequency signal received by a receiver.

Measure (3) controls the polarization state of the local oscillator light obtained by the Lo-LD in a distributor such that a mixed light is monitored in the distributor and a resultant monitor signal indicates the maximum power. In this method, a high receiving sensitivity can be obtained, however, it is technically difficult to perform polarization control of random polarization fluctuation of the modulated light transmitted through optical fibers, and is expensive.

In measure (4), the polarization state of the modulated light obtained by the light modulator is scrambled by the polarization scrambler provided after the light modulator in the transmitter, and then, the modulated light is transmitted to the optical fibers. However, in this method, it is very difficult to realize a polarization scrambler which is operational at a high speed.

FIG. 16 shows the fourth embodiment of a light distributing network through a coherent SCM optical communication system provided with a countermeasure to polarization to prevent the above described problems when the present invention is applied.

In FIG. 16, the unit assigned the number used in the third embodiment shown in FIG. 15 has the same function as that of the unit having the same number in FIG. 15.

The fourth embodiment shown in FIG. 16 is different from the third embodiment shown in FIG. 15 in the following point.

In the third embodiment, the mixing circuit 1505 and the Lo-LD 1506 are provided in the distributor B, and a local oscillator light is collectively mixed with a signal light in the distributor B for a plurality of receivers C.

By contrast, in the fourth embodiment, a mixing circuit 1601 and an Lo-LD 1602 are provided in a transmitter A, and the polarization controller 1603 controls the polarization state of the local oscillator light such that the polarization state of the modulated light from the light modulator 1503 coincides with that of the local oscillator light from the Lo-LD 1602.

With the above described configuration, the fourth embodiment is, as in the third embodiment, featured by that a single Lo-LD 1602 enables the local oscillator light and the signal light to be collectively mixed for a plurality of receivers C, that it is a coherent SCM optical communication system capable of largely increasing the number of receivable channels in a light distributing network at a low cost, and that precise polarization control can be performed in the transmitter A.

These features are specifically effective in a light distributing network in which the distance between a transmitter A and each receiver (subscriber) C is comparatively short.

In the fourth embodiment having the configuration shown in FIG. 16, a modulated light transmitted through the optical fiber 1504 is obtained by directly modulating a carrier light according to a microwave multiplexing signal for a plurality of channels. It can be also obtained by directly modulating a number of carrier lights having different frequencies (wavelengths) according to a microwave multiplexing signal for a plurality of channels, by mixing each of the carrier lights after being polarization-controlled as described above, and by light-frequency-multiplexing (wavelength multiplexing) them. With this configuration, the number of receivable channels can be increased as in the third embodiment.

The configuration in which a mixing circuit, an Lo-LD, and a polarization controller are provided in a transmitter as described above can be applicable, not only to a light distributing network shown in FIG. 16, but to a one-to-one optical communication system in which no distributors are provided between a transmitter and a receiver as in the second embodiment shown in FIG. 13.

Explanation of the fifth embodiment

Figure 17:
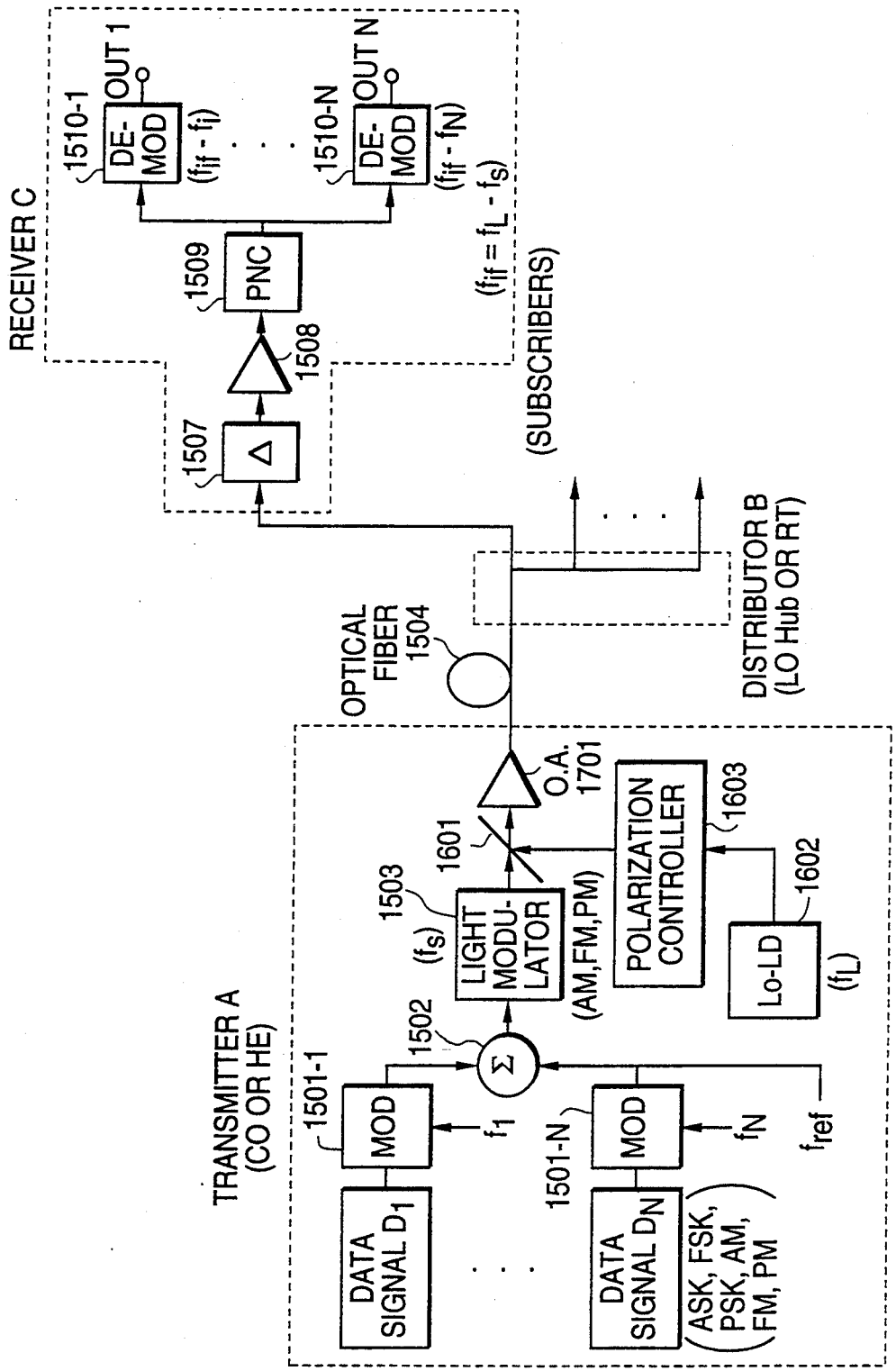
FIG. 17 shows the configuration of the fifth embodiment of the present invention.

FIG. 17 shows the configuration of the fifth embodiment of the present invention. As in the fourth embodiment shown in FIG. 16, the fifth embodiment of the present invention can be applicable to a light distributing network through a coherent SCM optical communication system provided with a countermeasure to polarization.

In FIG. 17, the unit having the same number as that of the unit assigned a number used in the fourth embodiment shown in FIG. 16 has the same function.

The fifth embodiment shown in FIG. 17 is different from the fourth embodiment shown in FIG. 16 in that a light amplifier (O.A.) 1701 is provided as a post-amplifier in the transmitter A.

With this configuration, the signal power from the transmitter A can be amplified, the system margin is increased, and the transmission distance is extended and the number of branches is increased in a light distributing network.

Explanation of the sixth embodiment

FIG. 18 shows the configuration of the sixth embodiment of the present invention. As in the fourth embodiment shown in FIG. 16 and the fifth embodiment shown in FIG. 17, the present invention is applied to a light distributing network through a coherent SCM optical communication system provided with a countermeasure to polarization in the sixth embodiment.

In FIG. 18, the unit having the same number as that of the unit assigned a number used in the fourth and fifth embodiments in FIGS. 16 and 17 respectively has the same function.

In the fifth embodiment shown in FIG. 17, the light amplifier 1701 is provided as a post-amplifier in the transmitter A, while a light amplifier 1801 is provided before the light branch in the distributor B in the sixth embodiment shown in FIG. 18.

With this configuration, the branch loss caused by the distributor B can be compensated by the light amplifier 1801, thereby increasing the number of branches.

With another configuration, a signal can be amplified by a light amplifier for each line after a light branch. The light amplifiers can be provided before and after the light branch. Additionally, these configurations can be mixed with the configuration of the fifth embodiment shown in FIG. 17 in which the light amplifier is provided in the transmitter A.

What is claimed is:

1. An optical communication system for communicating a data signal by modulating and transmitting light, comprising:

a plurality of electric stage modulating means, each provided corresponding to each of a plurality of transmission data signals for a plurality of channels, each for modulating a carrier signal having a different microwave frequency according to each of said transmission data signals and for outputting corresponding modulated signals, first frequency multiplexing means for frequency-multiplexing each of said modulated signals from each of said plurality of electric stage modulating means, second frequency multiplexing means for mixing a frequency-multiplexed signal outputted from said first frequency multiplexing means with an unmodulated signal having a frequency component which is not in the frequency band of said frequency-multiplexed signal, and for generating a composed signal therefrom, light modulating means for modulating light according to the composed signal generated by said second frequency multiplexing means and outputting a resultant modulated light, light receiving means for detecting said modulated light and converting said detected modulated light to an electric signal, unmodulated component extracting means for extracting from said electric signal from said light receiving means the frequency component of said unmodulated signal, delay means for delaying said electric signal from said light receiving means by a time equal to a signal delay time in said unmodulated component extracting means, and demodulating means for canceling phase noise according to a delayed electric signal outputted from said delay means and said frequency component of said unmodulated signal extracted by said unmodulated component extracting means and for thereby demodulating said transmission data signals.

2. The optical communication system according to claim 1, further comprising:

plural sets of said plurality of electric stage modulating means, said first frequency multiplexing means, said second frequency multiplexing means, and said light modulating means, each of said plural sets outputting a resultant modulated, and light multiplexing means for multiplexing each of said modulated lights from each of said light modulating means and outputting a resultant optical frequency multiplexed modulated light which is inputted into said light receiving means.

3. The optical communication system according to claim 1, wherein said light receiving means comprises:

local oscillating means for generating a local oscillator light, mixing means for mixing said local oscillator light from said local oscillator means with said modulated light, and light receiving element means for detecting a mixed light from said mixing means and converting said detected mixed light to an electrical signal.

4. The optical communication system according to claim 3, wherein said optical communication system is a light distributing network having a configuration such that said modulated light transmitted from a transmitter to a light transmission line are mixed by said local oscillating means and said mixing means provided in a repeater and then branch means provided in said repeater branches said mixed light, and each of said branched mixed light is received by a plurality of receivers each comprising said light receiving means, said unmodulated component extracting means, said delay means, and said demodulating means.

5. The optical communication system according to claim 4, further comprising:

light amplifying means provided adjacent said branch means in said repeater for amplifying said mixed light.

6. The optical communication system according to claim 3, wherein a transmitter comprises said local oscillating means, said mixing means, and a polarization control means for controlling a polarization state of said modulated light to coincide with a polarization state of said local oscillator light from said local oscillating means, and said modulated light and said local oscillator light are mixed by said mixing means with each of said polarization states controlled by said polarization controlling means, and said mixed light from said mixing means is transmitted to a light transmission line leading to a receiver comprising said light receiving element means, said unmodulated component extracting means, said delay means, and said demodulating means.

7. The optical communication system according to claim 6, wherein said transmitter further comprises light amplifying means for amplifying and transmitting to said light transmission line said mixed light from said mixing means.

8. The optical communication system according to claim 6, wherein said optical communication system is a light distributing network having a configuration such that said mixed light transmitted from said transmitter to said light transmission line is branched by branch means in a repeater, and each of said branched mixed lights is received by a plurality of said receivers each comprising said light receiving element means, said unmodulated component extracting means, said delay means, and said demodulating means.

9. The optical communication system according to claim 8, further comprising:

light amplifying means provided adjacent said branch means in said repeater for amplifying said mixed light.

10. An optical communication system for communicating a data signal by modulating and transmitting light, comprising:

a plurality of electric stage modulating means, each provided corresponding to each of a plurality of transmission data signals for a plurality of channels, each for modulating a carrier signal having a different microwave frequency according to each of said transmission data signals and for outputting corresponding modulating signals, first frequency multiplexing means for frequency-multiplexing each of said modulated signals from each of said plurality of electric stage modulating means, second frequency multiplexing means for mixing a frequency-multiplexed signal outputted from said first frequency multiplexing means with an unmodulated signal having a frequency component which is not in the frequency band of said frequency-multiplexed signal, and for generating a composed signal therefrom, and light modulating means for modulating light according to the composed signal generated by said second frequency multiplexing means and outputting a resultant modulated light, said modulated light to be converted to an electric signal for demodulating said transmission data signals by extracting the frequency component of said unmodulated signal from said electric signal and canceling phase noise according to said frequency component of said unmodulated signal.

11. An optical communication system for communicating a data signal by modulating and transmitting light, comprising:

light receiving means for detecting modulated light prepared by modulating light according to a composed signal generated by mixing carrier signals modulated according to transmission data signals with an unmodulated signal, and converting said detected modulated light to an electric signal, unmodulated component extracting means for extracting from said electric signal from said light receiving means a frequency component of said unmodulated signal, delay means for delaying said electric signal from light receiving means by a time equal to a signal delay time in said unmodulated component extracting means, and demodulating means for cancelling phase noise according to a delayed electric signal outputted from said delay means and said frequency component of said unmodulated signal extracted by said unmodulated component extracting means and for thereby demodulating said transmission data signals.

* * * * *